Feb. 7, 1961  M. BERCHTOLD  2,970,745
WAVE ENGINE
Filed Sept. 8, 1954  8 Sheets-Sheet 1
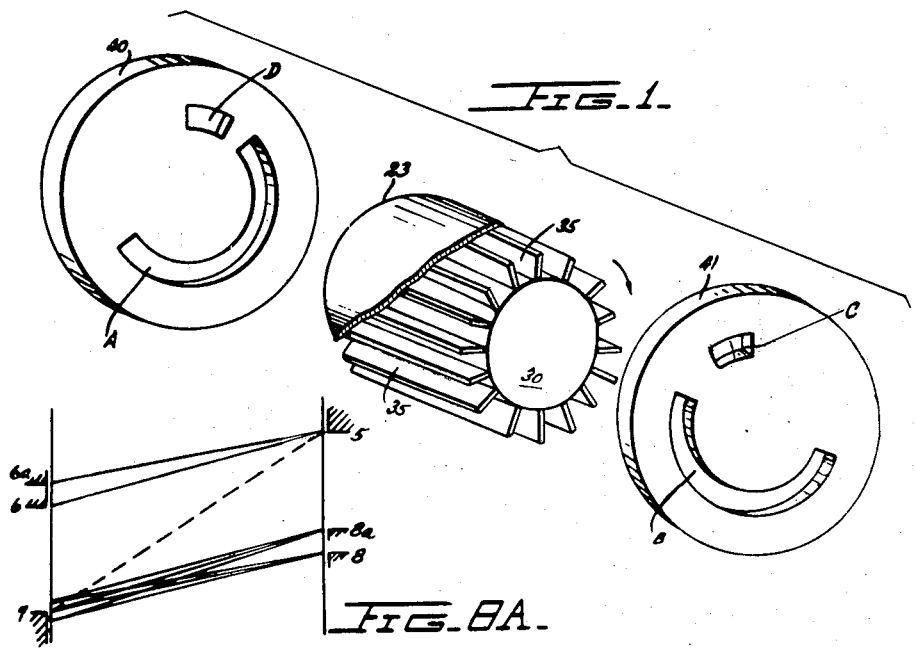
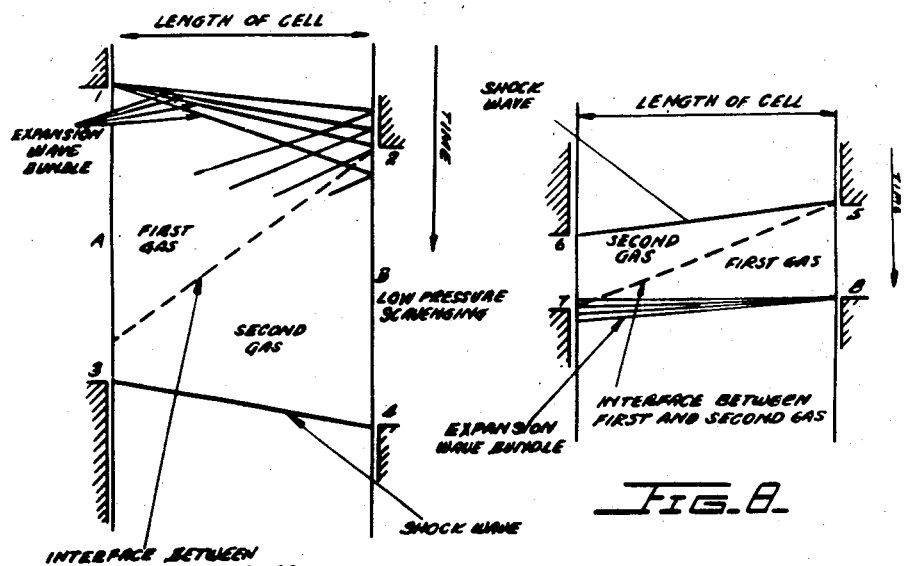
INVENTOR.
MAX BERCHTOLD
BY *Ostrolenk, Faber,*
*Gerb & Soffen*
ATTORNEYS Feb. 7, 1961  M. BERCHTOLD  2,970,745
WAVE ENGINE
Filed Sept. 8, 1954  8 Sheets-Sheet 2
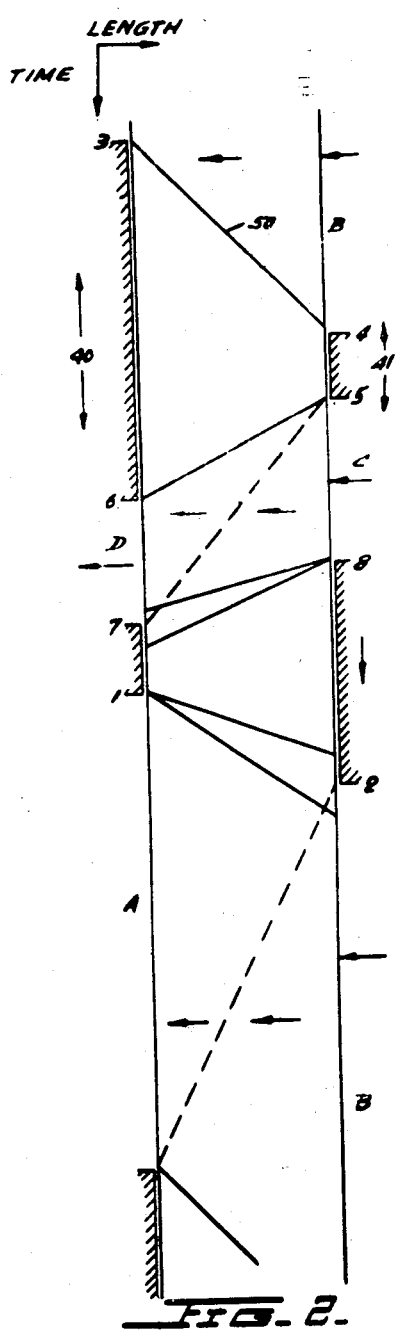
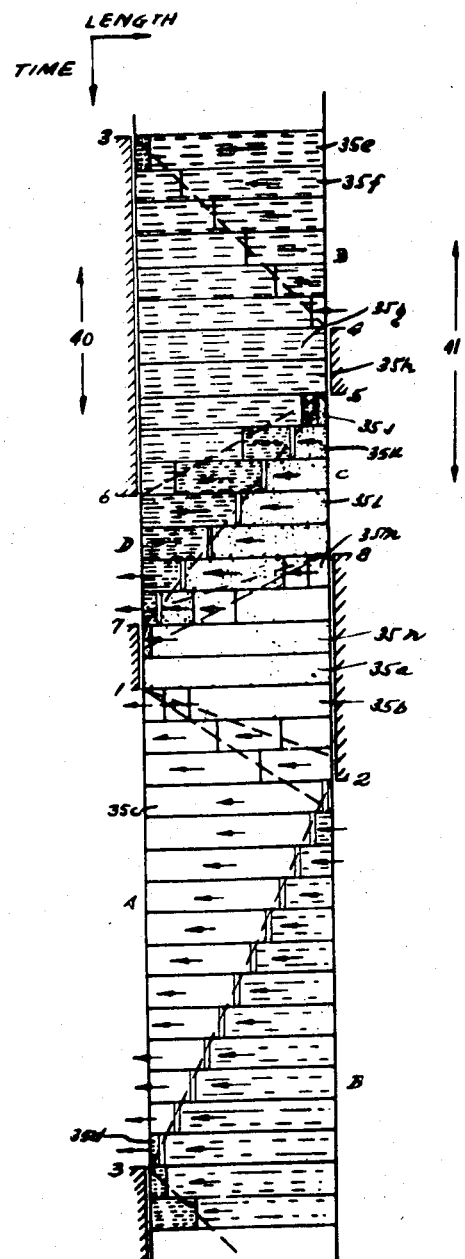
INVENTOR.
MAX BERCHTOLD
BY
ATTORNEYS

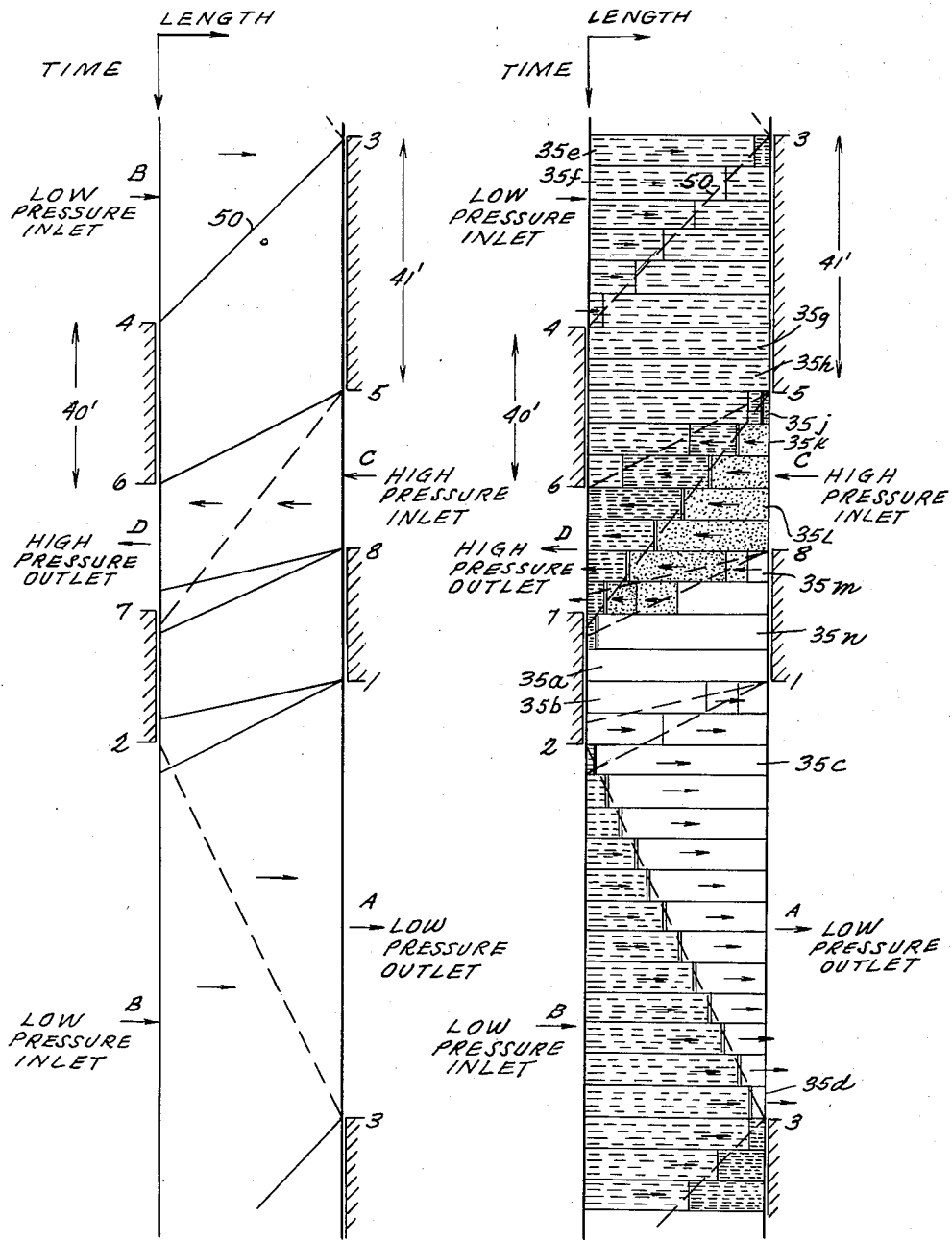

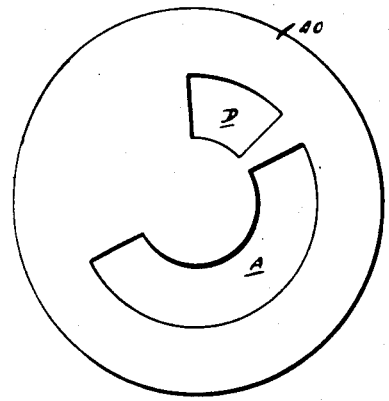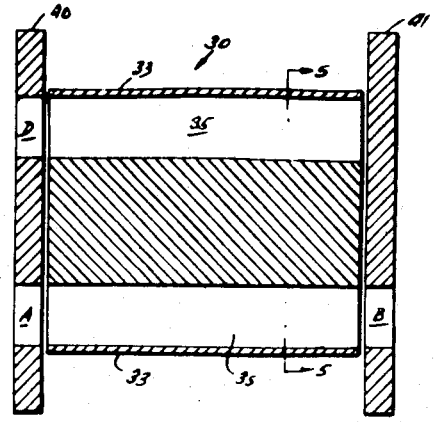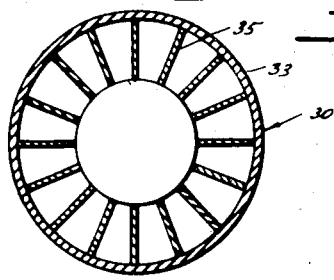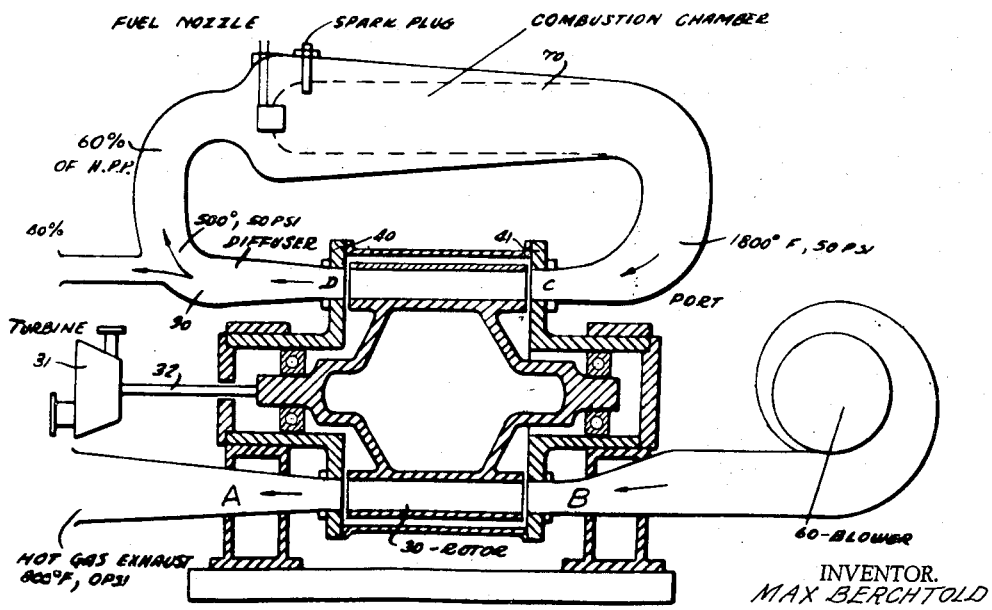

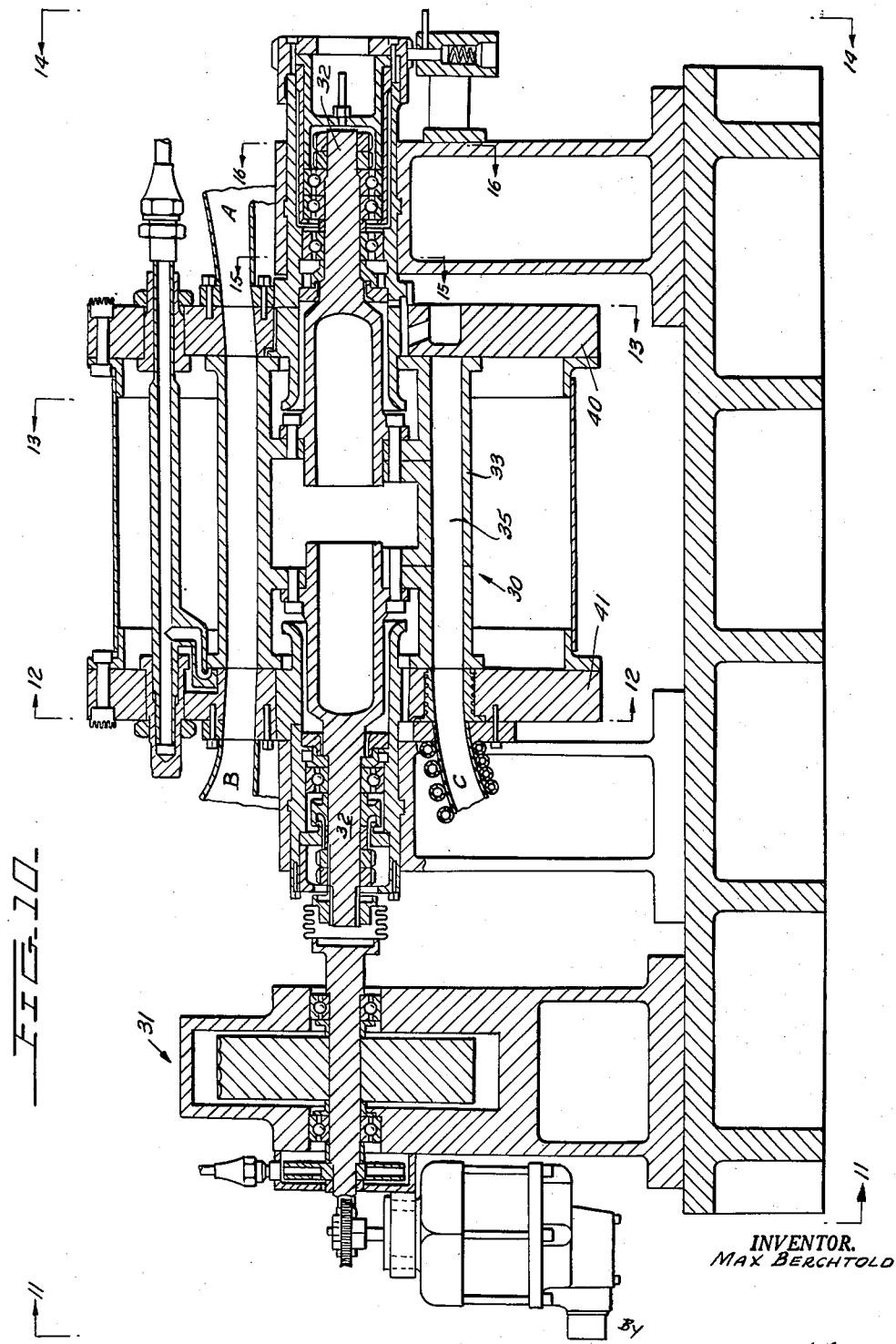

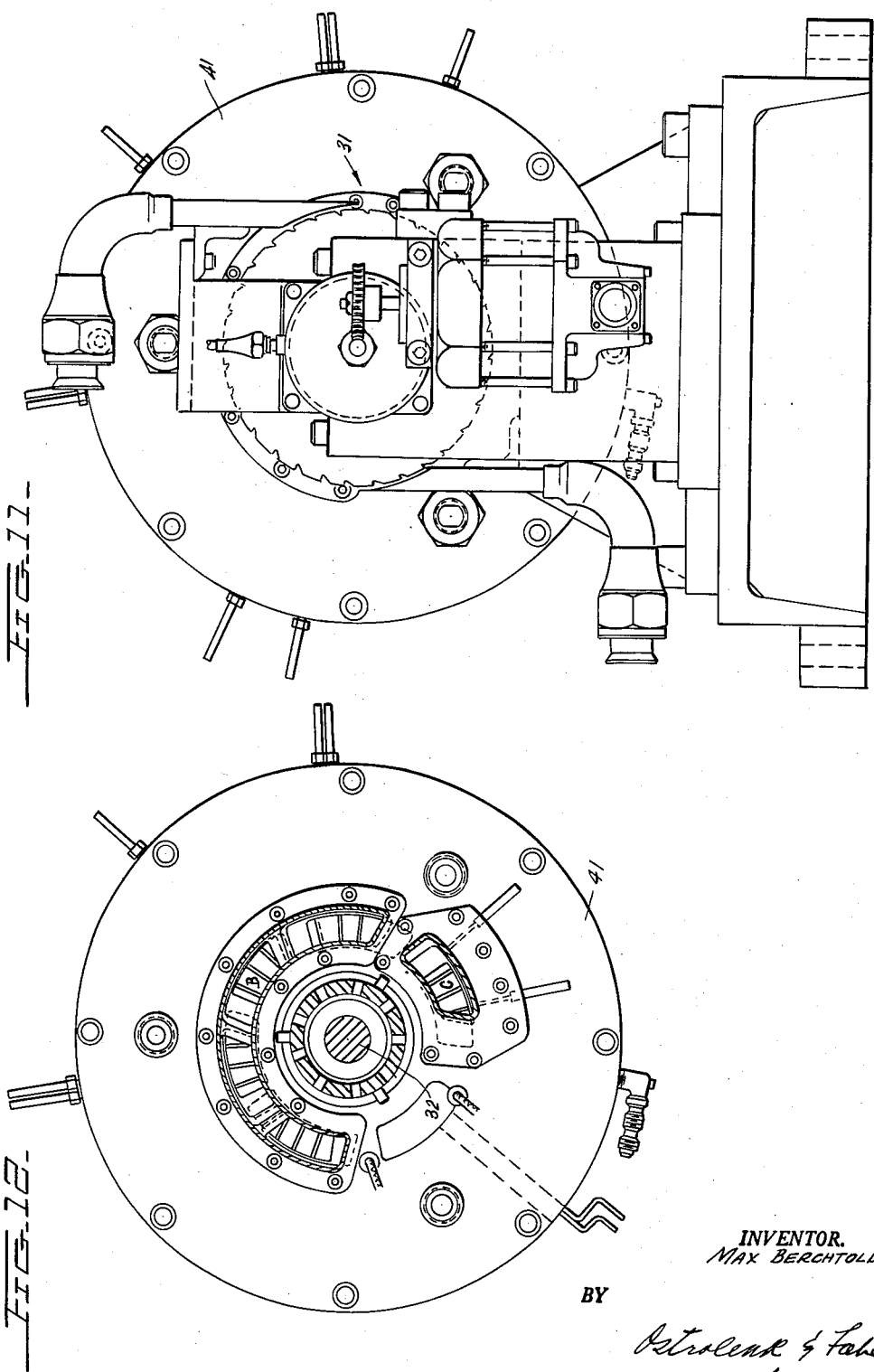

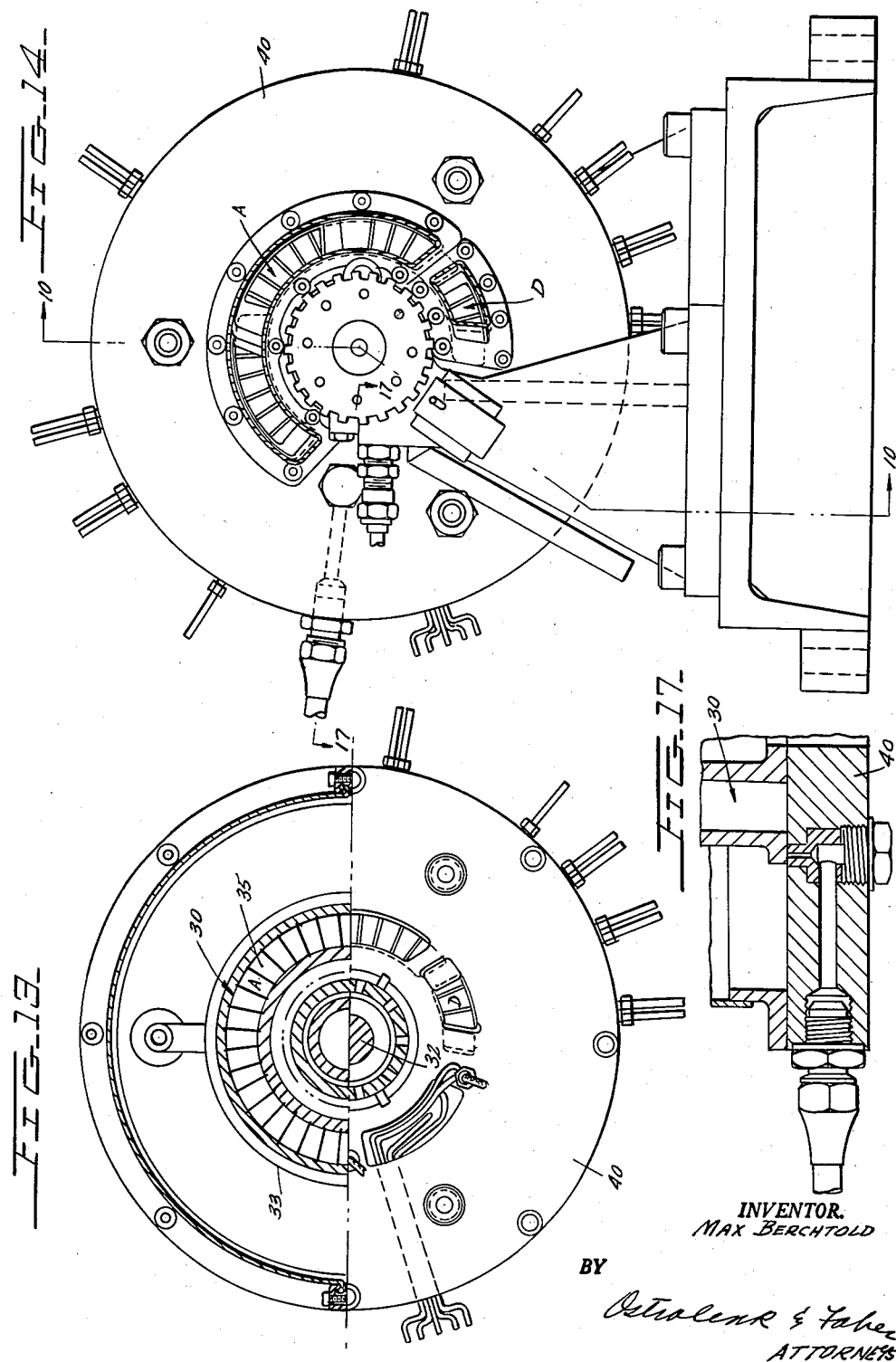

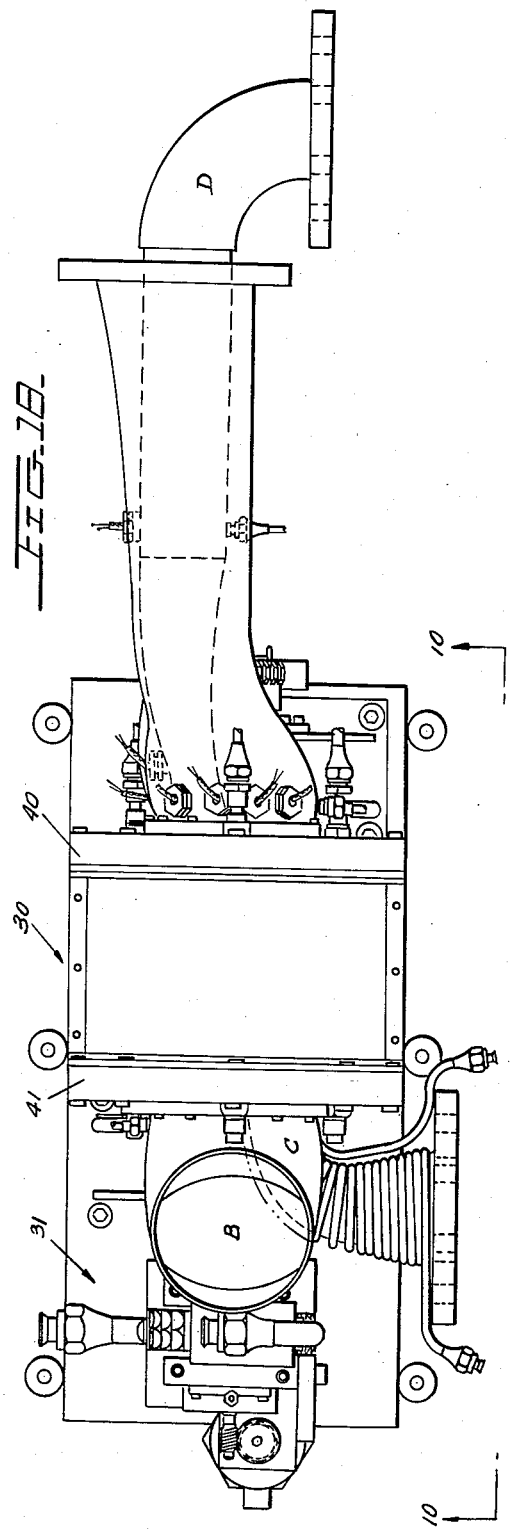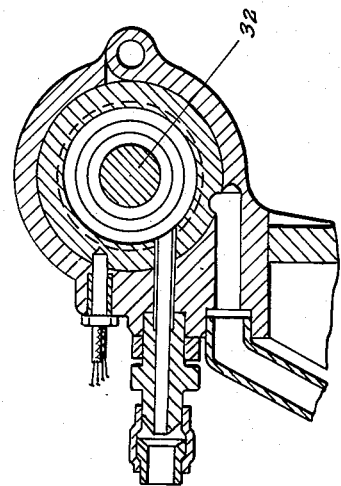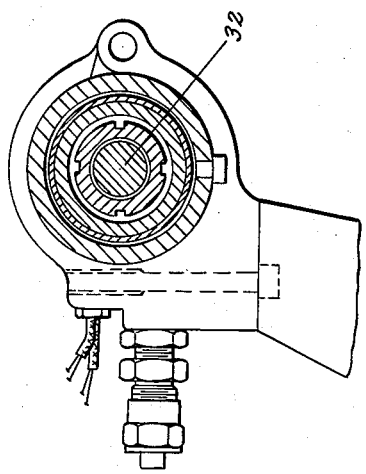

United States Patent Office 2,970,745
Patented Feb. 7, 1961

2,970,745

WAVE ENGINE

Max Berchtold, Paoli, Pa., assignor to I-T-E Circuit Breaker Company, Philadelphia, Pa., a corporation of Pennsylvania Filed Sept. 8, 1954, Ser. No. 454,774

22 Claims. (Cl. 230—69)

My present invention relates to a wave engine and more particularly to a machine in which aerodynamic effects known primarily as instationary flow phenomenon as contrasted with stationary flow phenomenon form the primary basis of the operation of the machine.

My present invention is a continuation-in-part of my copending applications Serial No. 274,181, filed February 29, 1952, and Serial No. 316,743, filed October 24, 1952, both assigned to the assignee of the instant invention and now abandoned.

Heretofore in the operation of apparatus which depends upon compression, combustion and expansion of gases, machines utilizing this cycle of operation or this general type of operation have fallen into two major classifications: (1) the piston engine, and (2) the turbine.

In each of these operations, any instationary flow phenomenon (fluctuation of static pressures and velocities) were almost invariably undesirable side effects to the principal operating phenomenon and most of the design and development work in piston engines or turbine engines has been directed toward the removal of the deleterious side effects which may be caused by instationary flow phenomenon.

Essentially, however, in my novel wave engine which utilizes primarily the instationary flow phenomenon which heretofore were undesirable in other types of heat cycle engines, certain portions of the operations can be compared to and perphaps regarded as of the same genus as the general type of operation occurring in prior heat cycle engines.

In my novel wave engine, a gas is introduced into a channel to compress another gas. To this extent, the gas which is introduced may be likened to the piston in a piston-cylinder engine. If this were merely the operation, then the machine would constitute merely a substitution of a gas piston for a solid piston and would be somewhat parallel to the utilization of fluids in, for instance, combined pneumatic hydraulic systems where one of the fluids is compressed in order to compress the other.

This is not the case, however, in my novel mechanism since the compression wave, generated by the introduction of the first gas to impinge upon the second gas, in traveling through the second gas at a speed greater than the speed of the interface between the two gases is used to produce the output of the machine.

The actual bodily movement of the gases and of the interface between the gases is used for supplementary but necessary operations as, for instance, exhaust of used gas and intake of gases to be compressed, but the output power is as above pointed out derived from the compression and expansion waves.

In heat cycle engines, there are a compression phase, a combustion phase and an expansion phase.

In the case of the piston engine, the single piston normally operates to compress the gas. This operation may be derived from another movement of an adjacent piston or from a flywheel. Thereafter, combustion occurs of the compressed gas and thereafter, the third phase of expansion of the gases owing to the combustion drives the piston in an operating stroke. Thus, in a single unit (cylinder and piston) performs the three functions in a piston engine, but it does so at different phases or portions of its stroke or cycle.

In the turbine, the operation depends upon three separate units. The gas is compressed by a compressor; the compressed gas is then heated by internal or external combustion unit; the heated gases then expand along the turbine vanes in order to drive the compressor; the difference in shaft horsepower represents the output.

In my novel wave engine, owning to the fact that I utilize, not the stationary flow phenomenon used in the piston engine or the turbine engine, but rather the instationary flow phenomenon or the compression and expansion waves which arise owing to the impingement of one gas upon the other, I have been able as a necessary consequence of the utilization of the instationary flow phenomenon to combine the function of compression and expansion in a single rotating unit.

Many attempts have been made to devise engines which depend on the impingement of one gas on another and a large number appear in prior patents with no concept or utilization of wave effects since they used one gas merely as the equivalent of a piston.

Other prior devices such as Burghand (British) 1921/1913, Knauff (British) 2,818/1907, Lebre, 2,045,-152, have attempted to recognize some vaguely understood "acoustic" phenomenon which, at best, have a very low energy level and could not produce a recognized pressure necessary to produce any power.

More recently, the prior art has recognized instationary flow phenomenon but by failing to understand all of the aspects thereof has produced experimental devices in which satisfaction was derived from the fact that the machine could operate at all even without expecting or obtaining a power output that would justify competition with the piston engine or turbine engine.

An example of such prior attempts to devise a wave engine utilizing instationary flow phenomenon is shown in the Seippel Patent No. 2,399,394.

Seippel did not recognize all of the phenomenon involved and, failing to make necessary allowance for other phenomenon such as the correct shock wave propagation speed, finite opening and closing time of the channels, effects of heat transfer on timing, has failed to produce an output pressure more than two to two and one half times the intake pressure.

My invention, therefore, is based on a full realization of the actual characteristics of instationary flow phenomenon and further a realization and full utilization of the fact that these instationary flow phenomenon comprising compression waves and expansion waves have certain specific characteristics, including (a) a speed which is greater than the speed of the interface between the gas which initiates the compression wave and the gas on which the first gas impinges; (b) the fact that expansion waves spread out while on the other hand compression waves have a definite wave front; (c) the introduction or presence of shock waves which behave differently from the compression and expansion waves because they travel faster than the speed of sound.

My novel wave engine is so arranged that these various characteristics of instationary flow phenomenon are utilized in the dimensioning of ports, rotational speed, timing and arrangement of my engine so that at the very least due allowance will be given for these phenomenon in the operation of my device so that the actual power output will not be decreased and, at best, the power may be increased by appropriate allowance for these phenomenon.

The operation depends on the combination, timing and sequence of the compression and expansion wave to produce a unidirectional substantially continuous output of compressed gas at pressure ratios as high as an even above four times the intake pressure.

In prior wave engines, the mere fact that a wave was generated and the power thereof was used was deemed to be sufficient but this concept has never previously led to a usable machine other than a mere laboratory device.

In addition to allowing and compensating for the actual conformation and operation of the waves which comprise the instationary flow phenomenon, there are mechanical or thermal aspects to the operation of any device which may utilize these instationary flow phenomenon which must be allowed for.

To enumerate a few of these, they are:

(1) That fact that the channel ends cannot be opened and closed instantaneously but that there is an opening time which is a function of the speed of rotation of the rotor carrying the channel and the angular width of the channel and the port dimensions.

(2) The hot gas and the cool gas necessarily mix at the interface, thereby requiring an adjustment of the opening and closing time of the channels which takes into account this zone of intermixed gas at the interface.

(3) Heat exchange occurs at various areas and zones in the engine. The most important aspect of the heat exchange occurs between the gas and the channel walls which affects the timing and volumetric output of the engine. Appropriate recognition of this phenomenon makes possible the conformation of an engine which will have the best operating efficiency with respect to this and all of the other phenomenon.

(4) The effects of the necessary clearance between the rotor and the plates on the wave strength, wave timing and wave flow balance.

Thus, my novel wave engine utilizes not merely the instationary flow phenomenon which include the compression and expansion waves but operates properly and performs and delivers a usable power output consistent with the actual energy input providing a relatively high efficiency because the phenomenon above set forth with respect to instationary flow phenomenon are combined with the three phenomenon which the machine itself presents in the appropriate combinations of compensating factors which will produce the highest efficiency, since heat cycle engines necessarily work on a marginal output.

It is the recognition of the side effects of the instationary flow phenomenon and a recognition of the necessary operating characteristics of the machine itself which makes it possible to adjust the operating elements of the machine to effect the various compensations required that produces an efficient machine which justifies the shift from other heat cycle engines to my novel machine.

Stationary flow processes are characterized generally by the fact that pressure velocity, temperature and other factors at any given point remain relatively constant over a measurable interval of time.

Instationary flow processes are characterized generally by the fact that pressure, temperature and velocity at any given point vary in relatively wide ranges over very small time intervals.

The basic relationships between flow, velocity, pressure, temperature and propagation velocity must be known for the understanding of the operation of the wave engine.[1] These are given below for ideal gas (air and combustion gas can be considered ideal gases) which are characterized by the following thermodynamic relations:

$$pv^k = RT$$

[1] References: Deffaller, P.—The application of a Graphic Method to Some Dynamic Problems in Gases, Sulzer, Tech. Review, No. 1, 1945. Hall, Newman A.—An Introduction to the Analysis of One-Dimensional Non-Steady Flow, Meteor Report, UAC-44, 1950, unclassified.

$pv^k$=constant for isentropic compression and expansion $$a = \sqrt{gkRT}$$

where
$p$=absolute pressure
$T$=absolute temperature
$v$=specific volume
$R$=gas constant
$k=c_p/c_v$=ratio of specific heat at constant pressure and at constant volume
$a$=velocity of sound
$g$=gravitational constant The isentropic relations can be written:

$$\frac{P_2}{P_1} = \frac{v_1 K}{v_2} = \frac{T_2}{T_1}\frac{k}{k-1} = \frac{a_2}{a_1}\frac{2k}{k-1}$$

Indices 1 and 2 refer to different states of constant entropy.

The basic equations for one dimensional instationary flow can be expressed as the change of local sonic velocity and the change of flow velocity.

$$\pm \Delta u = \pm \frac{2}{k-1}\Delta a$$

$\Delta u$=change in flow velocity
$(+\Delta u)$=acceleration
$(-\Delta u)$=deceleration
$\Delta a$=change of local velocity of sound
$(+\Delta a)$=compression (increase in velocity of sound)
$(-\Delta a)$=expansion (decrease in velocity of sound)

$k = c_p c_v$ (see above)

The pressure ratio $$\frac{P_2}{P_1}$$

produced by a change in flow velocity $u$:

$$\frac{P_2}{P_1} = \left[\frac{1 \pm (\pm \Delta u)\left(\frac{k-1}{2}\right)}{a_1}\right]^{\frac{2k}{k-1}}$$

$(+\Delta u)$=acceleration
$(-\Delta u)$=deceleration
$1+$=compression
$1-$=expansion The absolute propagation speed $c$ of a partial wave is $$c = (u \pm a)$$

$(u+a)$=acceleration and compression
$(u+a)$=deceleration and expansion
$(u-a)$=acceleration and expansion
$(u-a)$=deceleration and compression For compression, partial waves produced later progress faster than those produced earlier ones.

The given wave relations apply only for reversible compression waves which are generated by gradual changing flow velocities; that means as long as none of the partial waves overtake each other. Partial waves which overtake form a shock wave; that means strong wave of infinitely narrow front. The same type of wave is generated by an instantaneous change of flow velocity. The pressure relation is then:

$$\frac{P_2}{P_1} = 1 + k\frac{cu}{a_1^2}$$

$c$ is the shock wave propagation speed.

$$u_1 \pm c = u_1 \pm \frac{k-1}{4}\Delta u + \sqrt{\left(\frac{k+1}{4}\right)[2\Delta u^2] + a_1^2}$$

$(+)$ applies for acceleration
$(-)$ applies for deceleration

The shock wave no longer is isentropic or reversible.

The loss is a function of the shock strength $u/a$. In this case $$\frac{V_1}{V_2} = \left(\frac{P_2}{P_1}\right)^{\frac{1}{k}}$$

no longer correct;

$$\frac{V_1}{V_2}$$

can be computed from $$\frac{V_1}{V_2} = \frac{c}{c-u}$$

These six types of waves are utilized in the described invention. A major portion of the compression and the expansion are performed by combinations of these six types of waves. The fact that (a) expansion waves spread out, (b) the opening and closing of the ports takes a finite time, (c) heat is being exchanged with channel walls, (d) mixing occurs at the interface, minor waves are generated which are superimposed to the major waves. The minor waves generally have deleterious effects.

In the present invention, the control, sequence and timing of the wave may, to achieve the necessary high intake of output ratio, require that a compression wave be followed by another and possible even more compression waves before an expansion wave occurs; and that two or possibly more successive expansion waves occur before the next compression wave.

The successive compression waves may operate in the same or opposite directions and are created by different forces.

In the operation of the present invention, two basic types of compression waves are to be considered.

(1a) The first is a wave produced by a sudden deceleration of fluid flow. This wave proceeds from the decelerating point upstream, that is, back in a direction opposite the direction of flow and builds up a zone of compressed decelerated fluid behind the moving wave.

(1b) The second is a wave produced by a sudden accelerating force applied to one surface of a fluid body, the force then being transmitted progressively through the fluid body starting from said surface and successively accelerating the particles of said fluid body. This thereby forms a wave traveling through said fluid body in the direction of flow and builds up a zone of compressed and accelerated fluid behind the moving wave front.

In the application of these principles to my machine, a channel filled with a moving fluid is suddenly closed at the end toward which the fluid moves to produce compression wave of the type 1a. When wave 1a has traversed the channel to the opposite end, the channel is closed at that end. Since the channel is now closed at both ends, the fluid is maintained in its compressed state.

Further compression is achieved by connecting either end of said channel to a source of fluid under pressure higher than the pressure in the channel. This fluid is the operative fluid which is to be expanded by wave action. The compression wave 1b then starts at the last mentioned connected end through the channel. At the moment the compression wave reaches the opposite end of the channel, the opposite end is opened to a pressure level higher, equal to or lower than the wave pressure. The fluid compressed by successive waves 1a and 1b now flows in compressed form through the opposite end. The opposite end may then be connected to a suitable means for translating the compressed output fluid into another form of energy.

It is of utmost importance that the said opposite end be opened at the right time and remain open for only the right interval.

If it is opened too soon, then for at least part of the opened cycle, fluid under the pressure generated only by wave 1a or at lower pressure will emerge.

If it is opened too late, then compression wave 1b will have time to begin to reflect back as a 1a type wave compressing the fluid ahead of it and halting the intake velocity, thereby reducing the output mass flow.

If it stays open too long, then the compressed gas compressed by 1b will be followed by hot gas.

The recognition of these phenomenon and the adjustment of the various elements of the machine to compensate for these phenomenon turns the wave engine from a mere laboratory phenomenon or toy into an operable device which may be used in industry.

The basic object of my invention is the formation of a novel wave engine.

Another object of my invention is the conformation and operation of a wave engine in which all of the operating elements are so adjusted and integrated that appropriate allowance is made for the various side effects above enumerated of instationary flow phenomenon in appropriate combinations with the various necessary and inherent mechanical and thermal aspects of the machine in which the instationary flow phenomenon are to operate to produce a power output.

A further object of my invention is the provision of novel means for compensating for shock waves which may occur.

A further object of my invention is the arrangement of the opening and closing times of the channels constituting my novel wave engine so that appropriate allowance is made for the fact that the compression waves and expansion waves have a wave front across the channel which is in a plane transverse to the channel.

A corollary object of my invention is the arrangement of the channels, the ports, the dimensions and speeds of rotation so that the relationship among the various phenomenon will be such that appropriate compensation is made for the fact particularly that all of the operations—no matter how rapid—of the wave engine are performed over a finite period of time. It is the lack of recognition in the prior art of this fact that every operation, no matter how short a fraction of time it took, nevertheless occurred over a finite period of time that made the prior art inoperative and unsuccessful.

It should also be borne in mind that any cooling cycles are actually heat cycles in reverse operation of the machine as a power absorber rather than a source of power, it should be understood that the same type of unit may be utilized as a prime mover and may also be utilized in an instance where heat absorption is of use as, for instance, in refrigerating or air conditioning applications.

In addition, in the operation of my machine, after the intake ports are passed, the gas held in the cell is in a uniform condition. Consequently, the power output may selectively be placed on either side of the channels. Thus, where it is of value, the power output port and the air intake port wave may be on the same side of the rotor or they may be on opposite sides of the rotor and their relative positions may be reversed as required.

The foregoing and many other objects of my invention will become apparent in the following description and drawings in which:

Figure 1 is a schematic view showing a rotor and inlet and outlet ports adapted to the practice of my invention.

Figure 2 is a schematic developed view of the rotor and ports showing the conditions of the gases in each section of the rotor with respect to temperature and pressure for forward cycle operation.

Figure 2a is a schematic view similar to Figure 2, but shows a reverse cycle of operation as distinguished from a forward cycle of operation.

Figure 3 is a view identical with that of Figure 2 but showing the conditions of the gases with respect to several related cells of the rotor.

Figure 3a is a schematic view similar to Figure 3, but shows a reverse cycle of operation as distinguished from a forward cycle of operation.

Figure 4 is a longitudinal section through one type of rotor and stationary ports adapted to be used in the practice of my invention.

Figure 5 is a cross-sectional view taken on line 5—5 of Figure 4 showing the cells of my rotor.

Figure 6 is an end view showing a plate carrying ports for use in connection with my rotor.

Figure 7 is a diagrammatic view showing the operation of the pressure interchange at gas interfaces in cells moving between one pair of ports.

Figure 8 is a view like that of Figure 7 showing the conditions in the cells moving between another pair of ports.

Figure 8a is a diagrammatic showing of correction of port location for adiabatic conditions owing to heat exchange with cell walls.

Figure 9 is a schematic view showing my novel apparatus used as a source of power or more particularly as a source of gas at high pressure and temperature.

Figure 10 is a cross-sectional view of the stator and rotor of my novel aero-dynamic wave machine. This figure represents the physical embodiment of the schematic apparatus illustrated in Figure 9.

Figure 11 is a view taken in the direction of the arrows 11—11 of Figure 10 and illustrates an end view of the timing drive member and one stator plate.

Figure 12 is a view taken in the direction of the arrows 12—12 of Figure 10 and illustrates an end cross-sectional view of the ports and one stator plate of the device.

Figure 13 is a view taken in the direction of the arrows 13—13 of Figure 10 and illustrates a cross-sectional view of the rotor.

Figure 14 is a view taken in the direction of the arrows 14—14 of Figure 10 and is an end view of the second stator plate.

Figure 15 is a view taken in the direction of the arrows 15—15 of Figure 10 and illustrates the bearing housing.

Figure 16 is a view taken in the direction of the arrows 16—16 of Figure 10 and illustrates a second cross-section of the bearing housing.

Figure 17 is a view taken in the direction of the arrows 17—17 of Figure 14. This figure illustrates the valve means which may be used to determine the clearness between the rotor and the stator.

Figure 18 is a top view of the physical apparatus illustrated in Figure 10. In this arrangement, if the gap between the stator and the rotor is self reduced so that there is insufficient clearness, the air flow from the valve will be stopped thereby indicating that there is insufficient clearness and hence, adjustment between the stator and rotor can be made to provide the required clearness.

Referring first to Figures 1, 4, 5, 6, 9, 10, 11, 12, 13, 14, 15, 16, 17 and 18, the rotor 30 is driven for rapid rotation about its axis in any suitable manner as by a turbine 31 connected to the rotor by shaft 32. The rotor 30 is a drum having an outer shell 33 and a plurality of cells 35 extending more or less parallel to the axis of the rotor adjacent the periphery thereof.

Two plates 40 and 41 are placed on opposite sides of the rotor in the closest possible proximity thereto consistent with the high-speed rotation required in the rotor to obtain the best possible gas tight seal. The plate 41 on the input side of the rotor is provided with port C for input of hot gas at elevated pressure and temperature and port B for input of cold gas at ordinary or ambient temperature and at pressures which may be as low as ambient but which may for increased efficiency (and to ensure scavenging of the cells as hereinafter described) be at slightly higher than ambient, say of the order of 1.1 times the absolute ambient pressure.

Plate 40 on the exhaust side of the rotor is provided with port D for exhaust of gases at elevated pressure and port A for exhaust of hot gases at ambient pressure.

The exhaust from port D may be used partly for power purposes, the rest being used for feed back to the rotor at high temperature. The temperature is raised at practically constant pressure in a combustion chamber or heat exchanger and is fed into the rotor through input C.

The rotor 30 is rotated at the speed which produces the required timing for the waves and the interfaces with respect to the ports.

As the individual cells of the rotor move successively past the opposite ports A and B and then D and C, the creation and propagation of the various waves as well as pressure interchanges which occur owing to the movements of the interfaces are demonstrated in the developed views of Figures 2 and 3 as well as in the diagrammatic views of Figures 7, 8 and 8a.

Actually, the action of the waves can be more readily understood by cutting a slot in a sheet of paper of the approximate dimension of a cell 35 of Figure 3 and sliding this slot transversely down Figure 2. This operation is demonstrated in part by Figure 3 which duplicates Figure 2 but shows the cells superimposed and, for clarity, shows the pressure conditions in only a few spaced cells.

In Figures 2 and 3 the cold gas is represented by dashed lines and the hot gas is represented by dots. The pressure of the gases is represented by the relative closeness of the dots and dashes. The movement of the gas is indicated by arrows.

It should be noted that cold gas at ambient or only slightly higher than ambient pressure is always present at input port B and that hot gas at high pressure is always present at input port C.

The cells in the rotor are continuously moving past the ports and the closed spaces between ports. Thus, the cycle, for purposes of description, may start at any point. For example, the initial description will start with the low pressure cycle, that is, at a cell 35a which has passed port D (the cells move down with respect to Figures 2, 3, 7 and 8) but has not yet reached port A.

Cell 35a is closed at both ends by plates 40 and 41. The first (initially hot) gas is trapped in cell 35a at an elevated pressure.

The cell 35a when it reaches position 35b (see Figures 2 and 3) is now suddenly opened at one end (point 1) and is connected with the exhaust A in which there is a static pressure lower than the initial pressure in the cell. As a consequence of that, a series of expansion waves of small amplitude starts traveling through the cell, all starting simultaneously at point 1 (now refer also to Figure 7), but each one traveling somewhat slower than the preceding one so that the zone covered by them becomes progressively wider. The pressure in front of this wave bundle is equal to the pressure at the initial stage and the pressure behind the wave bundle is equal to either the pressure existing in the exhaust or equal to the critical pressure belonging to the initial pressure in the cell, depending on which one is higher. Each single wave of the bundle produces only a small pressure drop; consequently, the pressure decreases gradually through the whole bundle. Hand in hand with this gradual pressure decrease the gas particles become gradually accelerated until they travel with a velocity corresponding to the entire pressure ratio across the wave bundle and depending on the temperature of the gas towards the exhaust A. The propogation speed of one such single wave of very small amplitude is equal to the arithmetical means of the vector sum of the velocity of sound of the gas and the flow velocity ahead of the wave and of the sum of the velocity of sound of the gas and flow velocity behind the wave.

As soon as the first expansion waves reach the other and still closed end of the cell at plate 41, they are reflected. Since the pressure behind a reflected wave is lower than the pressure in front of it, the pressure decreases rapidly at the closed end. This right-hand end of the cell at position 35c is opened to the second or cold gas intake B at point 2 as soon as the pressure in the cells has reached approximately the same value as the total pressure existing in the cold gas intake B. As soon as the pressure in the cells is lower than the total pressure in the cold gas intake B, the second or cold gas starts flowing into the cell. The whole contents of the cell is now moving, the second or cold gas replacing the first gas and the remaining hot gas in the cell from position 35c to position 35d being scavenged out. (See Figures 2, 2a, 3 and 3a.)

The exhaust A is closed when the cell reaches position 35e (see top and bottom of both Figure 2 and especially Figure 3) at point 3 when all of the first or cold gas is scavenged out. A certain amount of blow through may be necessary in order to guarantee complete low pressure scavenging. For this reason, port A is lengthened somewhat as seen in Figures 2, 2a, 3 and 3a. The first gas particles which reach the closed end at 3 get stopped suddenly. Their kinetic energy is transformed into pressure. An instant later when the cell reaches position 35f, another group of gas particles is stopped, this time not by the wall but by the already stopped particles ahead of it. The kinetic energy of these latter particles in turn is transformed into pressure and so on. By that mechanism a shock wave is created. The pressure ratio reached by this compression depends upon the magnitude of the flow velocity which has been stopped and on the temperature of the gas in question. A pressure wave is now traveling upstream; the gas ahead has the original pressure and velocity; the gas behind it is at an elevated pressure and at rest. Contrary to the expansion waves mentioned above, the compression wave in question is one distinct wave which changes the pressure and the velocity discontinuously.

The propagation speed of this wave relative to the gas ahead of it is distinctly larger than the velocity of sound of the gas; the bigger the pressure ratio across its front, the faster it moves.

At the point where the shock wave 50 (Figure 2) reaches the other end of the cell when the cell is at position 35g, the cold gas intake at port B is closed at point 4. The first or hot gas which originally was trapped in the cells at an elevated pressure (at cell location 35a) is now replaced by the second or cold gas also at an elevated pressure as the rotor moves from cell location 35g to cell location 35h. The final pressure of the second or cold gas at cell locations 35g to 35h is as a rule different from the initial pressure of the first or hot gas. Expansion of the first gas and compression of the second gas were done solely by wave actions, that is, by transformation of pressure into kinetic energy or vice versa in utilizing the fact that across a bundle of expansion waves or across the compression wave a difference in pressure and velocity can exist.

It is possible to make the total pressure in the intake B equal to the static pressure in the exhaust A. However, under these circumstances, the flow velocity in the cell will decrease with time and reach the value zero as soon as the driving power of the first portions of the first gas which leave the cell at a rather high velocity is used up. This effect may either unduly prolong the scavenging or even make complete scavenging impossible. If the total pressure in the intake is raised above the static pressure (by 1.1 times the absolute exhaust pressure as indicated in Figure 9) in the exhaust the scavenging velocity will not decrease to zero but will eventually reach a value depending on the ratio of total intake pressure to static discharge pressure. This final velocity may be higher or lower than the velocity of the first portions of the first gas that leaves the cells, depending on the value chosen for the total pressure in the intake. One means for stepping up the total pressure in the intake is to employ a blower 60 as shown in Figure 9. If the total pressure of the intake and the static pressure in the exhaust are equal or only moderately different, the high speed portions of the first gas which leave the cells at first can be used as the driving jet in a jet pump to speed up the low velocity portions of the first gas, thereby improving the scavenging.

The cell taken by way of example from location 35a through successive locations to location 35h has been individually described. It will be understood that each cell of the rotor goes through this procedure, the use of a plurality of cells providing a steady flow in all four connecting ducts. Instationary flow is limited to the rotor proper.

The cell at position 35h is now ready for the high pressure cycle with the cold gas trapped at elevated pressure between plates 40 and 41.

The cell when it reaches location 35j at point 5 is now open to the first or hot gas nozzle C.

The total pressure in the inlet nozzle is higher than the pressure in the cell at 35j. The first or hot gas, therefore, starts flowing into the cell at 35j. The first particles of the first gas which leave the inlet nozzle impinge with a certain velocity on the second gas and by that action compress it and put it in motion. The first particles of the second gas which were subject to that impingement in turn push against the particles of the second gas adjacent to them, compress them, put them in motion and so on. This mechanism again creates a shock wave, refer also to Figure 8, which travels faster than the gas now set in motion. The pressure ratio across the wave depends on the pressure and temperature of the second or cold gas and on the total pressure and total temperature of the first or hot gas. The propagation speed of this wave is higher than the velocity of sound of the second or cold gas in which it travels, and it is dependent on the pressure ratio across the wave front.

Ahead of the wave is one part of the second or cold gas still at its initial state and behind the wave is first the other part of the second gas at a further elevated pressure with a certain velocity and then the portion of this first or hot gas which has already entered the cell at the same pressure and velocity (see cell 35k of Figure 3). Although pressure and velocity of the first and second gas behind the shock wave are equal, the total pressures will not be equal since the temperatures in the two gases in general will be different.

When pick-up D is reached at location 35L, all the initial gas is compressed and is not being pushed into the pick-up D.

As soon as the expansion wave reaches the other end of the cell at plate 40 at location 35n, the pick-up D is closed at 7. It may often be advantageous to close the pick-up somewhat earlier (as seen in Figures 2a and 3a) in order to be sure that no particles of the first or hot gas, which might have mixed with the cold air at the interface, enter the cold gas pick-up D.

At the moment where the inlet nozzle C is closed at cell location 35n the particles of the first gas which were the last ones to enter the cell get stopped. Since nothing is flowing in any more, they cannot progress any further into the cell. The particles ahead of the ones that entered last, however, are still in motion. The particles that entered last, therefore, expand down to a certain intermediate pressure. Then the next adjacent particles not being pushed any more stop and, therefore, expand and so on. This means a bundle of expansion waves (see lower portion of Figure 8) starts travelling in downstream direction through the cell. This bundle behaves essentially the same way as described for cell location 35b (upper portion Figure 7). Both the pressure and velocity decrease gradually. The outflow across the bundle at any instant of this phase velocity in the pick-up D in particular will start to decrease at the moment where the first expansion waves arrive there. The propagation speed of these waves is the same as described in connection with cell location 35b. The point of closure of the intake nozzle (point 8) is now chosen in such a way that the point where the outflow velocity in the pick-up reaches approximately zero coincides with the point of the pick-up closure 7. This does not always have to be like this since it may in certain cases be more advantageous to close the intake nozzle C later in order to avoid a strong drop in velocity in the later part of the pick-up D.

Despite the fact that now the cells are closed on both ends the gas does not have to be entirely at rest. There will be some minor waves which still travel back and forth in the cells and which will locally accelerate or decelerate the gas. With the closure of the pick-up D, the status described in connection with cell location 35a is again reached where the first gas is trapped in the cells at an elevated pressure which, however, may undergo local fluctuations.

From what has been said up to now, it can be seen that the points 1, 2, 3, 4 must be located with respect to each other according to certain definite rules. The same holds true for the points 5, 6, 7, 8. There is, however, no definite rule as to how these two groups have to be tied together. There is no strict relationship, for instance, which indicates how much time has to elapse before one cycle can be started after completion of the preceding one.

Thus, the distance from 4 to 5 may be varied substantially as long as the relationships of points 1, 2, 3 and 4 on the one hand and points 5, 6, 7 and 8 on the other hand are established consistent with the speed of wave propagation, the speed of rotation of the rotor and the length of the channels.

Likewise, there is no strict rule which requires that exhaust A be on the same side as the pick-up D or on the side of the intake nozzle C. A workable cycle can be established with ports B and D on one side and A and C on the other such as illustrated in Figures 2a and 3a.

The question as to how the two cycles are to be oriented with respect to each other is to be decided in consideration of the particular application.

It will in general be advantageous to let as little time as possible elapse between the completion of one cycle and the beginning of the next one in order to reduce the leakage of gases to the outside to a minimum during the time the cells are closed on both sides.

As pointed out for cell location 35j, velocity and static pressure of the two gases behind the shock wave in the high pressure cycle are equal. Since the second gas is colder than the first one, its density will be higher and also its total pressure. The weight flow leaving the cell into the pick-up D will, therefore, be larger than the weight flow entering the cells through the nozzle C. From this pick-up weight flow a portion equal to the nozzle weight flow will be taken away as indicated schematically in Figure 9 and heated up by combustion chamber 70 to the total temperature which exists in the nozzle C. This portion will then enter the nozzle C as the first gas. The rest of the pick-up weight flow at outlet 80 is useful output gas and can be used in any desired way, for example, to drive a turbine or is used for jet propulsion or in any other suitable manner.

As mentioned above, the total pressure of the second or cold gas leaving the cells into the pick-up D is larger than the total pressure of the first gas entering the cells from the nozzle C. There is, therefore, a certain surplus of total pressure at least in the portion of the second gas which enters the cell again as the first gas at the nozzle C after being heated up. In general, there will be a diffuser 90 at the pick-up D which reduces the velocity of the second gas leaving the cell by transforming it into pressure. The inefficiency of this diffusion will use up part of that total pressure surplus. A further part may be lost as pressure drop which the second gas experiences in flowing from the pickup D through the combustiion chamber to the nozzle C. What is left over from that surplus can be used to perform useful work, for example, by utilizing the turbine effect at the rotor intake C and/or pick-up D.

Since the cells are alternately filled with hot and cold gas, the cell walls experience a very efficient cooling and the top temperature of the cycle may be chosen higher than in conventional gas turbine cycles. A cycle where the intake B is on the same side as the nozzle C as herein described will produce a more uniform cooling over the whole length of the cells since all the cold gas which enters the cells passes through their entirety. The drawback of this arrangement is that hot gases which may not be scavenged out completely at the end of the low pressure cycle will enter the pick-up D, thereby making the machine less efficient.

If the temperatures are not too high, it will be more advantageous to have the intake B on the same side as the pick-up D as illustrated in Figures 2a and 3a. In this case only a very small portion of the cold gas will traverse the whole cell by that producing a distinctly hot end of the cells on the side of the exhaust A and the nozzle C and a distinctly cold end of the cells on the side of the intake B and the pick-up D. On the other hand, any portion of the first gas which is not completely scavenged out at the end of the low pressure cycle can be made to leave through the exhaust A by appropriate choice of the point of closure of the pick-up D thereby resulting in complete low pressure scavenging.

Where the wave engine is to be used as a power absorbing unit, the first gas is colder than the second gas, that is, at one given pressure the first gas is at a lower temperature than the second gas at the same pressure. As a consequence of that, the weight flow leaving the cells through the pick-up D will be smaller than the weight flow entering the cells through the nozzle C. At the same time, the total pressure in the pick-up D will be smaller than the total pressure in the nozzle C. The deficiency in weight flow and total pressure has to be made up from an outside source. This could be done, for instance, by an outside compressor. The compressor would furnish the driving jet in a jet pump which would compress the second gas leaving the pick-up to such an extent that the deficiency in total pressure plus all pressure drops the gas might experience would be covered. The weight flow deficiency would be made up by the gas which is added in the form of the driving jet.

The second gas is then sent through a cooler before it enters the cell again as the first gas. The first gas then leaves the cell through the exhaust A at a reduced temperature and can be used as coolant for any sort of cooling process.

The question whether the intake B should be on the same side as the nozzle C as seen in Figures 2 and 3 or on the side of the pick-up D as seen in Figures 2a and 3a again depends on the particular case. If high temperature differences are employed, it may be more advantageous to have the intake B on the same side as the nozzle C in order to have a cell with fairly uniform temperature distribution. Where only small temperature differences are used, it may be more advantageous to put the intake B on the same side with the pick-up D as seen in Figures 2a and 3a in order to facilitate the low pressure scavenging.

As previously pointed out in connection with Figures 1, 4, 5 and 6, in this particular design the cells are represented by a plurality of axial passages 35 in a drum-shaped rotor 30. The opening and closing of the cells is obtained by two plates 40 and 41 which are placed one on each side of the rotor and which carry appropriate ports A and D, C and B. While the rotor is turning, the ends of the cells are opened and closed depnding on whether they are exposed to an open port or to the solid plate. The position of the opening and closing edges or controlling edges of those ports have to be located in accordance with the rules stated above.

Of the four characteristic values of the rotor, diameter, hub-tip ratio, length and r.p.m., only the length and the r.p.m. are inter-related with each other from the point of view of aerodynamics. Diameter, hub-tip ratio and r.p.m. will have to be inter-related in such a way that the stresses in the rotor do not become excessive. Apart from that, the diameter and the hub-tip ratio of the rotor define only the amount of weight flow which is being handled by the rotor.

The connection between r.p.m. and rotor length is given by the required timing. For one particular rotor length for instance, the shock wave which is created at point 5 at the moment of the opening of the nozzle C will take a certain well-defined time to traverse the passage. During that time, the rotor has to be timed to such an extent that as soon as the shock wave arrives at the other end of the rotor, the passage is facing point 6 at the beginning of the pick-up D.

The most simple arrangement is one where there is only one process consisting of one high and one low pressure cycle per revolution. It is however, possible to have more than one process per revolution by multiplying pairs of ports, and it is immaterial how these different processes are oriented with respect to each other. Different orientations may have different advantages. One possibility, for instance, is to arrange two processes which each have the nozzle C and the intake B on the same side in such a way that the nozzle C and the next intake B are on the opposite sides of the rotor. This arrangement would guarantee a uniform rotor temperature combined with an easy low pressure scavenging.

The more processes arranged on one rotor the shorter the rotor becomes for one given r.p.m. Two processes will, for instance, reduce the rotor length to half as compared with the one process case.

Summarizing the foregoing and emphasizing the more important points:

The relationships in Figures 2 and 3 among the four corners 5, 6, 7 and 8 on the one hand and corners 1, 2, 3, 4 on the other hand have been referred to.

As described above, an essential element of the operation is that output D should be closed at the instant when the operative fluid reaches the output D. Points 6 and 7 defining D are thereby related to point 5 of input C.

That is, for a channel of certain length moving at a certain speed with an initial fluid compression of predetermined value and an operative fluid pressure of predetermined value, point 6 should be related to point 5 by the time for compression 1b to travel the length of the channel and point 7 should be related to point 5 by the time for the interface between the initial fluid and the operating fluid to travel the length of the channel.

One difficulty which arises at input C for the operative fluid is that input C must have a finite length and, therefore, must be closed at some point. However, the closing of input C at corner 8 produces an expansion wave at that point. This expansion wave is set up by reason of the fact that the particles in the channel are at that moment in motion. This expansion wave arises, of course, because the supply is cut off. Therefore, the particles in motion in the channel moving away from the end at which the supply originally entered produces the expansion wave.

The expansion wave moves in the channel faster than the interface Q and, therefore, overtakes the interface. Consequently, point 7 in the output D must be so located not only that it will close the channel at the moment when the interface reaches the output D but also must close the channel at the moment when the expansion wave reaches the output D. This, however, necessarily relates back to point 8, the closing corner for input D, since both the expansion wave and the interface must reach point 7 simultaneously on the output side D; therefore, point 8 on the input side must be so located that it will provide the proper timing for the expansion wave and is, therefore, displaced rearwardly of point 7 by a distance which, related to the length of the channel, the speed of movement of the channel and the times of travel of the two waves, will be equal in time to the length of time that the expansion wave will take to traverse the channel.

That is, point 8 will be displaced from point 7 by the angle through which rotor 30 turns while the expansion wave travels through the channel.

For the described application, the expansion wave moves faster than the compression wave and, therefore, makes the output port D smaller than the input port C.

The expansion wave is not a single discrete wave but, owing to the nature of an expansion wave, it spreads out or fans out while it travels through the channel. The pressure gradient in the wave front decreases as the wave progresses. The expansion wave generated at point 8 produces a bundle of small diverging expansion waves which, however, are confined by the channel walls. Therefore, it becomes impossible to place point 7 accurately in order to cut off the expansion wave at a definite point; but, instead, a point must be selected either at the point where the very first of the expansion waves would reach the outlet of the channel or at the point where the very last of the expansion waves would reach the outlet of the channel or at some point in between.

The proper selection of the cut-off point, that is, the proper placement of point 7 within the range of the expansion wave becomes of supreme importance. This discussion of just where point 7 will be located with respect to the bundle of expansion waves which reach output D will occur later, but the proper selection of point 7 constitutes a most important aspect of novelty in the present invention.

As soon as the channel leaves output D in its movement down with respect to Figure 2 (which, of course, is a circumferential movement on the rotor) the channel is closed off at both ends with the partially expanded hot gas trapped therein.

This partially expanded hot gas is in the example herein described at a higher pressure than the outside pressure; but at this point, since the channel is closed at both ends, no operative function is performed. Therefore, the distance between points 7 and 1 has no bearing on the actual operation of the device and may be of any length required or useful, the only condition being that it should not be so long that substantial leakage or substantial change in the condition of the gases trapped within the channel should occur.

This waiting period or the fact that any time interval desired within reasonable limits could be used between points 7 and 1 was not pointed out or known in the prior art and constitutes another aspect of novelty herein.

Here again it should be pointed out that since the channel traveling between points 7 and 1 (just as the channel when it travels between points 4 and 5) is simply a closed container with gas at practically uniform condition throughout the entire channel, the portions of the channel and the arrangement of the input and output may be selected for either end of the channel without regard to the location of the input and output ports for the prior operation so that the aerodynamic wave machine can be designed as a forward cycle device as seen in Figures 2 and 3 or as a reverse cycle device as seen in Figures 2a and 3a.

As the channel in its movement comes into registry with port A, which is connected to a duct at a static pressure at least equal to or lower than the pressure in the channel, an expansion wave is generated from point 1 at port A. This expansion wave arises from the fact that particles in the channel are now brought into movement out through port A; this initiation of the movement of the particles creates the expansion wave which travels upstream in a direction opposite to the direction of movement of the particles.

The expansion wave and the speed of movement thereof is related to the input port B in such manner that point 2 of input port B is not reached by the channel until at least the expansion wave shall have reached the opposite end of the channel or even a little bit after the expansion wave has reached the opposite end of the channel.

Open port B before the expansion wave has reached the opposite end of the channel will result in some of the trapped compressed gases in the channel being ejected through the input port B in a direction opposite to that in which they are to go.

Opening input port B at point 2 after the expansion wave has reached the opposite end of the channel will result in opening the channel to input port B at time when the channel is at a greatly reduced pressure owing to the suction effect created by the expansion wave and thereby creating an additional inpetus for the gas or fluid entering through the input port B.

Again, the conditions previously set forth with respect to point 7 above are applicable here as applied to point 2.

The expansion wave generated at point 1 has the same characteristics as the expansion wave originally described with respect to point 8. Therefore, instead of a single discrete wave, we have a bundle of waves and it becomes necessary to select the cut-off point 2 to determine whether it will occur at or near the very first expansion wave or at or near the last expansion wave or at some point in between, or, in fact, at some point even displaced away from the whole expansion wave bundle altogether for other purposes.

The determination of the precise location of point 2 with respect to the expansion wave bundle is also one of the most important aspects of the present invention and that will later be described after the full operation has been examined.

The opening A, that is, the distance from point 1 to point 3 is sufficiently wide to permit the filling of the channel with gas to be compressed and is thus left open for a sufficient length of time so that this gas may flow in and force out or assist in the evacuation or scavenging of the original partially expanded or warm gases as illustrated in Figures 2, 2a, 3 and 3a.

The very earliest then that opening A should be closed and, that is, the very earliest location for point 3 is that at which the gas to be compressed reaches the opposite end of the channel. As a practical matter, it will be advisable to have port A opened somewhat longer and consequently move point 3 down to ensure complete scavenging of the original gases and the replacement thereof by the gas to be compressed.

The location of point 3 with respect to point 2 and even with respect to point 1 is, therefore, not critical. At the very least, it should be so located as to permit the gas to be compressed to fill the channel, but it may be displaced further away than that point without causing any major differences in the operation at all.

While the expansion wave generated at point 1 and reaching point 2 provides some initial impetus for the input air through port B, there is no assurance that this initial impetus would provide for complete inflow through the entire channel of the input air and, therefore, complete replacement of the hot gases.

Therefore, for proper operation of the device, it becomes desirable to ensure that the pressure at input B is higher than the pressure at output A. This can be accomplished, however, by a blower at input B or by some vacuum creating device such as an exhaust fan at the output A or by any other similar means which may be obvious to create some pressure differential by elevating the pressure at one side or depressing the pressure on the other side or a combination of both.

While blowers or some artificial means for creating a pressure differential are necessary between ports B and A, they are not necessary between ports C and D despite the fact that the input gas at port C and the output gas at port D are at the same static pressure. The substantially elevated temperature of the operative gas at port C imparts to the compressed gas enough kinetic energy to overcome the pressure rise of the diffusor even at diffusor efficiencies as low as 50%. Part of the compressed output air can be taken off for operative purposes and only the remainder (approximately 50%) of the output gas D need be used for combustion and expansion in the wave engine.

At this point, the full cycle is complete.

Having described and summarized the general structure and operation, the specific relationships which make my novel wave engine an efficient operating machine or structure will now be pointed out.

Novel aspects of the invention

One fundamental problem arises from the fact that the cells or channels necessarily have a finite transverse dimension and thus move past the boundaries 1, 2, 3, 4, 5, 6, 7 and 8 not instantaneously but over some time interval which may be relatively short but is nevertheless present. This means that there is a definite opening and closing time required for the ends of the rotor channels.

The best theoretical operation would be achieved if the ends of the channels could be opened and closed as the occasion requires instantaneously without any finite time limit of any kind. However, since the channels are moving past the corners which define the ports, that instantaneous opening and closing cannot be achieved but, instead, there is a gradual slope for opening and a gradual slope for closing.

The smaller the channels are with respect to the ports, the greater is the time during which the channel is fully open and, therefore, the greater the unimpeded operation of the channel through most of its cycle. If, for example, the channel width were equal to the width of the port, the channel would start to close just after it had fully opened. This means the full opening time would be zero and the operating efficiency would be poor.

Thus, it is necessary in the making of a useful machine to deal with the problem which is necessarily present of this inability instantaneously to open and close the channel. As will be pointed out hereinafter, the reduction of the number of blades of the rotor and, therefore, the reduction in the number of channels will provide increased efficiency in some respects of the operation, while, as pointed out in this connection (and useful in other connections), the increase in the number of blades and the consequent increase in the number of channels will provide factors of increased operating efficiency in other respects. The choice of the number of blades or channel widths, becomes, therefore, a compromise between various factors relating to operating efficiency and that will be discussed later.

Returning now to the opening and closing factor and its effect on operating efficiency, as pointed out above, since some finite time must occur for opening and closing I have by experiment determined for the particular size channel and speeds that I am now using the particular port opening edges for input and output, that the shock wave generated at the opening C will have the least deleterious effect at the output D when the channel is in a condition at the output port between from half to three-quarters open of the transverse dimension of the channel is open to the port at the moment the shock wave reaches that end of the channel.

It should be noted that a pressure wave is generated gradually at point 5 of intake C because the channel is not opened instantaneously. The gas first flows through a small slot and produces a local jet only. It is known that such jets form a vortex and, therefore, produce a transverse flow direction at the interface which results in mixing and even pocketing a small portion of the initial gas behind the operative gas. This free vortex forms a front which progresses through the channel creating more and more intense pressure waves which build up to a front or a shock wave by the time they reach the opposite end of the channel, and this shock wave, I have found, will produce the least deleterious effect if the channel at the opposite end is at least half but not more than three-quarters opened.

If the shock wave reaches the opposite end before any opening or when only a slight opening has occurred, the shock wave itself will be reflected creating in this case undesirable reflecting shock waves, thus dissipating energy into the exhaust. If the channel then opens, the gas at first flows into the pick-up D at too high a velocity and so introduces additional losses. However, if the shock wave should reach the port after the channel is fully opened, the gas in the channel has not been brought up to the output pressure of the shock wave; therefore, the gas will flow backwards into the channel as a returning shock wave. This wave will then intercept the main shock wave and produce a misplacement of energy into the exhaust in a similar way as first mentioned.

As a practical matter the reflecting shock wave cannot be avoided for a practical number of blades and the most efficient compromises I have found is having the channel one-half to three-quarters open at the time the shock wave reaches the end of the channel. Recorded velocity disturbutions at port D show that this condition produces the closest approach to the desired profile of velocities which can be achieved.

The finite closing time at first gas nozzle 8 produces a group of expansion waves forming an even more widely spread out bundle of expansion waves at the opposite end at point 7 than it would do for infinitely fast opening. Consequently, location of point 7 must be selected in the range between the time that the earliest and the last expansion wave reaches the opposite end.

The selection of the proper cut-off point is an important factor in the solution of the problem again from the point of view of maximum efficiency.

Owing to the finite opening time of the mixing at the channel, the interface Q between the operational gas and the gas to be compressed is increased and is, therefore, no longer a definitely determined boundary.

For an infinitely fast opening there would be a clear definition at the interface which would be diminished very little by diffusion due to molecular action in the gases which is somewhat increased by the fact that one gas is at a higher temperature.

These factors make location of point 7 much more difficult to determine. Thus, in addition to the variation in the bundle of expansion waves creating a problem as to the location of point 7, I have added to that the variation in the arrangement of the interface which creates a further problem with relation to point 7.

These two problems are combined in another way. Previously it was stated that the expansion wave and the interface should reach the closing edge of port D simultaneously. This means that the speed and the length of the rotor determine the location and dimension of the ports. Owing to the fact that neither the expansion wave nor the interface is now well-defined, the closing edge of port D should be defined more definitely.

One of the most important aspects of the invention is the understanding here of the basic problem. In the prior art the waves were given finite values and were understood as being clearly defined. The failure to realize that the expansion wave is not a single wave but a bundle of waves which in turn, by reason of finite channel opening time, is made into a further spread out bundle of waves and the failure to realize that mixing occurs at the interface led to structures and arrangements of the various ports and channels in the prior art to produce a result, the operation of which was not fully understood and the efficiency of which was low. This further produced in the prior art a machine which had limited range of operation at limited pressure ratio.

It is the recognition and solution of these problems to which the present invention is directed.

Since the interface in the channel between ports C and D is now not a clearly demarked boundary but an area of zone defining a boundary, I can in the operation of my device select different locations for point 7. Thus, for instance, point 7 may be located at the center of the zone which defines the space between the operative gas and the compressed gas or point 7 can be located at the boundary of the zone adjacent the hot gas or it can be located at the boundary of the zone adjacent the compressed gas. I have found that for the best efficiency in operation, the entire range of the interface zone (it should be borne in mind that this is a zone and not a well-determined line) should be regarded as part of the hot gas or operative gas so that point 7 is fixed at a point on the cold or compressed air side of the boundary with the arrangement being such that most of the contaminated or mixed gas in the boundary will form part of the exhaust by being blocked off at point 7 as seen in Figures 2a and 3a, thereby resulting in incomplete high pressure scavenging.

Point 7, as above pointed out, is also selected with respect to the arrival of the expansion wave bundle. As the expansion waves begin to arrive at the opposite end of the channel, the flow velocity begins to decrease to a great deal below the mean flow velocity. I arrange point 7 so that it will finally close the channel at about the time sufficient expansion waves have arrived to reduce the flow velocity at that channel to approximately one-fifth of the mean principal flow velocity.

The prior art has been content to close the compressed air pick-up at the point when the hot gas arrives at the end of the channel. Since I recognize that there is a boundary zone rather than boundary line between the hot and the cold gas, we place our closing point 7 at a location related to the interface so that we do not close the channel until portions of the gas in the zone comprising the interface begin to emerge and thus close the channel after the temperature at the output D starts to rise, closing off the channel, however, when the full force of the hot gas appears as seen in Figures 2, 2a, 3 and 3a.

When the channel is closed to point 7, the channel then moves down to point 1 without substantial change in its internal contents other than a slight loss of heat by conduction and loss of gas by leakage.

Theoretically, the gas is at rest while the channel is moving from point 7 to point 1. Actually, there may be waves resulting from reflection of partial expansion waves and waves created by effects of partial opening and closing. These waves even though they are minor represent losses.

When point 1 is reached by the channel, an expansion wave is formed which reflects back as a bundle of waves in the channel as it moves toward point 2. (This is like the action in connection with point 8 previously described.)

Point 2 is located so that some part of the bundle of expansion waves will reach the opposite end of the chanel at the time that opposite end of the channel reaches point 2.

This timing of the expansion wave is important so that the channel pressure at the opening B will be equal or be lower than the total pressure of the input gas so that the input gas from the blower at opening B may move readily into the channel and the residual gas remaining in the channel and thereby replacing this residual gas by the input gas.

It should be noticed that openings A and B are larger because the gases passing therethrough are at lower pressure, lower velocities, and lower densities. Since the openings A and B are larger, that means that they cover many more rotor channels than the high pressure ports, the effects of finite opening time are less important. This also makes the location of the openings, the corners 1, 2, 3 and 4 relatively less critical.

It should be pointed out that port A should be sufficiently wide and point 3 spaced appropriately so that gas may be blown through for a predetermined length of time to ensure complete low pressure scavenging as illustrated in Figures 2, 2a, 3 and 3a and cooling of the rotor.

The closing of the channel at point 3 which, of course, as previously pointed out is a gradual closing produces a bundle of compression waves which catch up with each other and reach the opposite end of the channel at the time point 4 is intercepted by the opposite end of the channel. This action is substantially similar to the action as between points 5 and 6 previously described and substantially the same factors are present except that they are of lesser importance owing to the lower pressures, velocities and densities involved.

Between point 4 and point 5 the channel carries the gas in relatively still or at rest position except for such minor waves as may continue in the gas trapped in the closed channel.

Various losses arise in the operation of the device. The losses due to leakage can be minimized where that is important by reducing the instances between points 4 and 5 on the one hand and points 7 and 1 on the other hand. Furthermore, it is from this standpoint essential that a channel should never be opened at one end to two different ports at one. That means that the distance between the closing edge of one port and the opening edge of the next one should amount to at least one channel width. This indicates how much time has to elapse between the completion of the high pressure cycle and the beginning of the low pressure cycle and vice versa and, therefore, places a practical operating limit on the distance between edges 7 and 1 on the one hand and edges 4 and 5 on the other hand.

The clearance between the rotor and the plates should be kept as small as possible.

By the reasoning applied above, the pressure produced by the instantaneous stopping of a flowing gas at, for instance, cell location 35e (Figure 3) will be lower if the channels are not closed completely, that is, if a certain clearance exists than in the case where the channels are perfectly closed.

In general, it can be said that all pressures in the rotor which are above the outside pressure will be somewhat lower with clearance than without and that any pressures which are below the outside pressure will be somewhat higher with clearance than without. An arrangement where the leakage area around one channel amounts to 8% of the total channel cross-sectional area has proved itself to be workable.

For operating reasons a finite clearance between the rotor and the plates is required. This clearance introduces leakages which affect the operation and the efficiency of the cycle.

Where no provision is made for counteracting the effect of the leakages, the operation is adversely affected because appropriate timing of the opening and closing of the channels is impaired by the differences in wave propagation spuds and change in pressures.

The efficiency is affected since the leakages introduce losses in mass flow which are no longer available for the output.

These two effects on operation and efficiency interact on each other.

Mass flow losses must be accepted in determining the size of the engine for a desired output.

Timing, however, can be adjusted for proper operation where clearances are known and predetermined:

Where, for instance, at channel location 35f, intake fluid has a flow velocity at one side at wave 50 and a no-flow condition at the other side of wave 50, clearance of plate 40 will however, impart a small flow to the latter portion of the fluid. This flow will decrease the difference in velocity between the flowing portion of the fluid and the portion which has been compressed. The change in velocity difference will result in a change of the factors which determine the timing of the intervals between operating and/or closing opposite ends of each channel. This modification of the factors which determine the time interval therefore results in modification of the spacing of the ports.

Thus, by making the clearance a predetermined rather than an acicdental factor, the velocity factor in the computations previously set forth may be modified in a predetermined way to permit appropriate solution of the equations at the beginning of this specification to obtain the exact time intervals (and hence, port spacing) required.

Also, by the reasoning applied above, the pressure produced at channel location 35b (Figure 3) is somewhat lower than if there had been no clearance whatever.

The more channels that are used for one given size of the rotor, the higher will be the friction losses and the heat transfer. The amount of friction which is to be expected depends on the ratio of rotor length to hydraulic radius of the channel cross-section. Purely from this point of view, it would be advantageous to have as few channels as possible.

As mentioned above, the channels are relatively exposed to the first gas and to the second gas. If the two gases are of different temperatures, heat exchange will take place from one gas to the other whereby the heat taken away from the hotter gas is first transferred into the rotor and then from there into the colder gas.

This heat transfer will in most cases be harmful for the proper working of the engine; in particular, it will reduce the output and require a change in posting and timing. In the case of the power producing engine, for instance, the difference in total pressure between the nozzle C and the pick-up D will be reduced due to the higher temperature in the cold gas and the lower temperature in the hot gas.

This difference may in certain cases be reduced to such an extent that this fact combined with the pick-up diffuser inefficiency will actually produce a total pressure deficiency between pick-up D and nozzle C instead of a surplus.

In consideration of this, it would, therefore, be advantageous to have a small number of channels. However, the reduction in the number of channels and thereby increasing channel sizes creates additional problems as above described with respect to partial channel opening.

The opening and closing time can be achieved by a substantial increase in the number of channels thereby making the movement of each channel past each point a relatively rapid one.

This compromise requires essentially that a relatively small number of channel is used than would be the optimum for perfect aerodynamic effect and more channels are used than would be the optimum for the best thermal effects in order to achieve an effective compromise and the best possible efficiency in operation.

To a great extent, many of these compromises are achieved empirically, primarily by first utilizing a minimum number of channels and changing the speed of rotation of the rotor and when the optimum speed for a rotor with a certain number of channels is determined making a rotor with a different number of channels and determine the desired speed of revolution of this rotor and so find the optimum conditions.

Owing to the fact that the rotor is subject first to hot gas and then to cold gas in a cycle which alternates during each revolution, it is possible to run the unit with gases at very high temperatures because the gas impinging on the vanes or blades of the rotor is not at a steady elevated temperature which may eventually distort or damage the vanes of the roto but varies between the extremely hot gas, for example, 2000° F. down to ambient temperatures, this variation in the temperature of the gas occurring once in each cycle from high to low.

Thus, the vanes which might otherwise be destroyed if continuously subjected to 2000° F. temperature can be safely used in this type of operation on account of the heat flow balance. It will permit the vanes to absorb heat very rapidly when the high temperature gas is impinged thereon and will also enable the vanes to give the heat away just as readily when the low temperature gas is passing through the channels.

Since the operational compressed gas output of the machine as well as many of its characteristics of operation depend for their exact functioning on an exact timing of the waves, the heat exchanges between the channel walls and the gases cannot be overlooked in determining the speed of the waves and hence, the timing of the opening and closing of the various portions of the ports.

Figure 8a shows the effect of the necessary adjustments due to heat exchange of the gases with the channel walls. This effect again is much more critical for the high pressure scavenging. Due to heating up of the air on the hot channel walls, the shock wave originating at point 5 progresses faster through the gas to be compressed; therefore, point 6 has to be moved from 6 to 6a. The hot gas giving heat to the relatively cooler walls has a decelerating effect onto the expansion wave propagation; therefore, point 8 has to be moved to location 8a.

The invention is based on recognition of the following problems which were not understood in the prior art and the solution of these problems:

(1) The recognition that instantaneous opening and closing of the channels is not possible. The invention, therefore, relates to the necessary compensations and adjustments for this fact.

(2) The recognition that there are no well-defined linear boundaries between the different gases in the cell but rather that these boundaries are zones of mixed gas. The port openings must be adjusted to allow for this factor.

(3) The recognition that the adjustments or spacing of the ports and their boundaries must be arranged not only with respect to the theoretical, that means adiabatic conditions, in the channel, but must also take into account, the heat exchange between the gases and the channel wall. This appears in a warming up of the cold gases and a cooling off of the warm gases which effects the propagation velocity of the waves it being an established physical effect that wave speed is a function of temperature.

These three factors determine the inter-relationship among points 5, 6, 7 and 8 and 1, 2, 3, and 4, respectively. When point 5 is fixed on as the desired distance from point 4, all of the other points 6, 7 and 8 are necessarily determined. Point 6 is determined by the time it takes for the compression waves building up into a shock wave to traverse the channel allowing for the effect of the heating up of the air and in the present invention is determined as the point where 50 to 75% of the channel is opened. Point 7 is determined by the time it takes for the interface zone to travel the length of the channel as above pointed out.

Point 8 is determined in its relation to point 7 by the time that it takes the expansion wave under the influence of the cooling effect of the cell walls to traverse the width of the channel with the suitable 20% allowance previously pointed out.

Thus, one of the novel elements is that the channel is already only partially opened, the degree to which it is opened depending on the various factors involved in the particular machine and particular application.

This applies also but to a lesser extent to the location of the corners 1, 2, 3 and 4 of the low pressure cycle.

All of these factors are based on a recognition of the fact that every operation, no matter how quickly it happens, occupies a finite length of time while the prior art failed to recognize this and failed to produce operative efficient mechanism.

In the foregoing, I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. A wave engine comprising a rotor, a plurality of channels carried by said rotor, said channels extending substantially parallel to the axis of the rotor; means for rotating said rotor about its axis at high speed; said channels each being open at each end; a first stationary end plate on a first side of the rotor closing the channel end on the first side; a second stationary end plate on the second side of the rotor closing the channel ends on the second side; a first port in said first end plate comprising an operative fluid inlet; a second port in said second end plate comprising a compressed fluid pick-up; a third port in one of said two end plates comprising an inlet for fluid to be compressed; a fourth port in said end plate opposite to that in which said third port is located comprising a low pressure exhaust; said channel ends registering with said ports during rotation of the rotor; said first, second, third and fourth ports being angularly positioned and proportioned with respect to each other to provide the following cycle of operation; each channel passing the fourth port and being closed at the end registering with the plate having the fourth port before it passes the third port; each channel traversing the third port until the pressure wave generated by the introduction of intake fluid reaches the plate in which the third port is located; said channel passing the third port and being closed when said pressure wave reaches said plate; said channel thereafter passing said first port; the opening of said channel to said first port producing a compression wave in said channel downstream of said operative fluid toward the second plate; said channel reaching said second port when the compression wave reaches said second plate; said channel passing said second port when the interface between the operative fluid and the fluid to be compressed in the channel reaches said second plate; an expansion wave generated within said channel when said channel is closed by the lagging edge of said first port; said channel leaving said first port at an interval of time preceding the channel leaving said second port; said interval being equal to the time necessary for the expansion wave generated by said closing of the first port to overtake the interface at the closing edge of the second port, said expansion wave comprising a group of waves; said channel being closed by passing the second port when the velocity of the gas in that port has been reduced to one-fifth of the initial undisturbed velocity.

2. A wave engine comprising a rotor, a plurality of channels carried by said rotor, said channels extending substantially parallel to the axis of the rotor; means for rotating said rotor about its axis at high speed; said channels each being open at each end; a first stationary end plate on a first side of the rotor closing the channel ends on the first side; a second stationary end plate on the second side of the rotor closing the channel ends on the second side; a first port in the first end plate comprising an operative fluid inlet; a second port in the second end plate comprising a compressed fluid pick-up; a third port in one of the two end plates comprising an inlet for fluid to be compressed; a fourth port in the end plate opposite to that in which the third port is located comprising a low pressure exhaust; said channel ends registering with said ports during rotation of the rotor; said first, second, third and fourth ports being angularly positioned and proportioned with respect to each other to provide the following cycle of operation; each channel passing the fourth port and being closed at the end registering with the plate having the fourth port before it passes the third port; each channel traversing the third port until the pressure wave generated by the introduction of intake fluid reaches the plate in which the third port is located; said channel passing the third port and being closed when said pressure wave reaches said plate; said channel thereafter passing said first port; the opening of said channel to said first port producing a compression wave in said channel downstream of said operative fluid toward the second plate; said channel reaching said second port when the compression wave reaches said second plate; said channel passing said second port when the interface between the operative fluid and the fluid to be compressed in the channel reaches said second plate; an expansion wave generated within said channel when said channel is closed by the lagging edge of said first port; said channel leaving said first port at an interval of time preceding the channel leaving said second port; said interval being equal to the time necessary for the expansion wave generated by the closing of the first port to overtake the interface at the closing edge of said second port, the interface comprising a zone of mixed hot and cool gases, said expansion wave comprising a group of waves, said channel being closed by fully passing the second port at the instant before said interface zone has reached said second plate to block emergence of the interface zone and when the velocity of the gas in that port has been reduced to one-fifth of the initial undisturbed velocity.

3. A wave engine comprising a rotor, a plurality of channels carried by said rotor, said channels extending substantially parallel to the axis of the rotor; means for rotating said rotor about its axis at high speed; said channels each being open at each end; a first stationary end plate on a first side of the rotor closing the channel ends on the first side; a second stationary end plate on the second side of the rotor closing the channel ends on the second side; a first port in the first end plate comprising an operative fluid inlet; a second port in the second end plate comprising a compressed fluid pick-up; a third port in one of the two end plates comprising an inlet for fluid to be compressed; a fourth port in the end plate opposite to that in which the third port is located comprising a low pressure exhaust; said channel ends registering with said ports during rotation of the rotor; said first, second, third and fourth ports being angularly positioned and proportioned with respect to each other to provide the following cycle of operation; each channel passing the fourth port and being closed at the end registering with the plate having the fourth port before it passes the third port; each channel traversing the third port until the pressure wave generated by the introduction of intake fluid reaches the plate in which the third port is located; said channel passing the third port and being closed when said pressure wave reaches said plate; said channel thereafter passing said first port; the opening of said channel to said first port producing a compression wave in said channel downstream of said operative fluid toward the second plate; said channel reaching said second port when the compression wave reaches said second plate; said channel passing said second port when the interface between the operative fluid and the fluid to be compressed in the channel reaches said second plate; an expansion wave generated within said channel when said channel is closed by the lagging edge of said first port; said channel leaving said first port at an interval of time preceding the channel leaving said second port; said interval being equal to the time necessary for said expansion wave generated by the closing of the first port to overtake the interface at the closing edge of the second port; a compression wave being generated within said channel when said channel is opened by the leading edge of said first port; said channel being opened at said second port in timed relation to said compression wave to permit one-half to three-quarters of the channel to be opened at the arrival of said compression wave at said second plate.

4. A wave engine comprising a rotor, a plurality of channels carried by said rotor, said channels extending substantially parallel to the axis of the rotor; means for rotating said rotor about its axis at high speed; said channels each being open at each end; a first stationary end plate on a first side of the rotor closing the channel ends on the first side; a second stationary end plate on the second side of the rotor closing the channel ends on the second side; a first port in the first end plate comprising an operative fluid inlet; a second port in the second end plate comprising a compressed fluid pick-up; a third port in one of the two end plates comprising an inlet for fluid to be compressed; a fourth port in the end plate opposite to that in which the third port is located comprising a low pressure exhaust; said channel ends registering with said ports during rotation of the rotor; said first, second, third and fourth ports being angularly positioned and proportioned with respect to each other to provide the following cycle of operation; each channel passing the fourth port and being closed at the end registering with the plate having the fourth port before it passes the third port; each channel traversing the third port until the pressure wave generated by the introduction of intake fluid reaches the plate in which the third port is located; said channel passing the third port and being closed when said pressure wave reaches said plate; said channel thereafter passing said first port; the opening of said channel to said first port producing a compression wave in said channel downstream of said operative fluid toward the second plate; said channel reaching said second port when the compression wave reaches said second plate; said channel passing said second port when the interface between the operative fluid and the fluid to be compressed in the channel reaches said second plate; an expansion wave generated within said channel when said channel is closed by the lagging edge of said first port; said channel leaving said first port at an interval of time preceding the channel leaving said second port; said interval being equal to the time necessary for the expansion wave generated by the closing of the first port to overtake the interface at the closing edge of the second port, the interface comprising a zone of mixed hot and cool gases, the expansion wave approaching the channel end as the channel traverses said second port comprising a group of waves, said channel being closed by fully passing the second port at the instant before said interface zone has reached said second plate to block emergence of the interface zone and when the velocity of the gas in that port has been reduced to one-fifth of the initial undisturbed velocity; a compression wave generated within said channel when said channel is opened by the leading edge of said first port; said channel being opened at said second port in timed relation to said compression wave to permit from 50 to 75% of said compression wave to emerge from said channel.

5. A wave engine comprising a rotor, a plurality of channels carried by said rotor, said channels extending substantially parallel to the axis of the rotor; means for rotating said rotor about its axis at high speed; said channels each being open at each end; a first stationary end plate on a first side of the rotor closing the channel ends on the first side; a second stationary end plate on the second side of the rotor closing the channel ends on the second side; a first port in the first end plate comprising an operative fluid inlet; a second port in the second end plate comprising a compressed fluid pick-up; a third port in one of the two end plates comprising an inlet for fluid to be compressed; a fourth port in the end plate opposite to that in which the third port is located comprising a low pressure exhaust; said channel ends registering with said ports during rotation of the rotor; said first, second, third and fourth ports being angularly positioned and proportioned with respect to each other to provide the following cycle of operation; each channel passing the fourth port and being closed at the end registering with the plate having the fourth port before it passes the third port; each channel traversing the third port until the pressure wave generated by the introduction of intake fluid reaches the plate in which the third port is located; said channel passing the third port and being closed when said pressure wave reaches said plate; said channel thereafter passing said first port; the opening of said channel to said first port producing a compression wave in said channel downstream of said operative fluid toward the second plate; said channel reaching said second port when the compression wave reaches said second plate; said channel passing said second port when the interface between the operative fluid and the fluid to be compressed in the channel reaches said second plate; an expansion wave generated within said channel when said channel is closed by the lagging edge of said first port; said channel leaving said first port at an interval of time preceding the channel leaving said second port; said interval being equal to the time necessary for the expansion wave generated by the closing of the first port to overtake the interface at the closing edge of the second port, the interface comprising a zone of mixed hot and cool gases, the expansion wave approaching the channel end as the channel traverses said second port comprising a group of waves, said channel being closed by full passing the second port at the instant before said interface zone has reached said second plate to block emergence of the interface zone and when the velocity of the gas in that port has been reduced to one-fifth of the initial undisturbed velocity; a compression wave generated within said channel when said channel is opened by the leading edge of said first port; said channel being opened at said second port in timed relation to said compression wave to permit from 50 to 75% of said compression wave to emerge from said channel; said channel being thereafter opened at said fourth port to permit exhaust of the hot fluid therein, said channel being thereafter opened at said third port to permit introduction of the cool fluid therein, said channel being thereafter simultaneously open at the third and fourth ports to permit scavenging of fluid in the channel.

6. A wave engine comprising a rotor, a plurality of channels carried by said rotor, said channels extending from one side to the other of the rotor; means for rotating said rotor about its axis at high speeds; said channels each being open at each end; a first stationary end plate on a first side of the rotor closing the channel ends on the first side; a second stationary end plate on the second side of the rotor closing the channel ends on the second side; a first port in the first end plate comprising an operative fluid inlet; a second port in the second end plate comprising a compressed fluid pick-up; a third port in one of the two end plates comprising an inlet for fluid to be compressed; a fourth port in the end plate opposite to that in which the third port is located comprising an exhaust; said channel ends registering with said ports during rotation of the rotor; said first, second, third and fourth ports being angularly positioned and proportioned with respect to each other to provide the following cycle of operation; each channel passing the fourth port and being closed at the end registering with the plate having the fourth port before it leaves the third port; an intake fluid entering at the third port and traversing the channel and impinging on the plate carrying the fourth port; each channel traversing the third port until the pressure wave generated by the impingement of intake fluid on the plate carrying the fourth port reaches the plate in which the third port is located; said channel passing the third port and being closed at a time interval after the closure of the fourth port which is a function of the length of the channel, the pressure, temperature and flow velocity of the intake fluid on the low pressure side of the pressure wave and of the clearance between the rotor and the plates; said channel thereafter passing said first port; the opening of said channel to said first port producing a compression wave in the gas to be compressed ahead of said operative fluid toward the second plate; said channel being opened at said second port at a time interval after the opening of the channel at the first port; said time interval being a function of the length of the channel, of the different temperatures of the different gases, of the equal pressures and flow velocities of the gases in the channel and of the clearance between the rotor and the plates; said channel being closed by passing said second port when the interface between the operative fluid and the fluid to be compressed in the channel reaches said second plate; said channel being closed by leaving said first port at a time interval preceding the closure of the channel when it leaves the second port; said time interval being equal to the time necessary for a portion of the expansion wave generated by the closing of the first port to overtake the interface at the closing edge of the second port; said channels being thereafter opened at said fourth port to permit exhaust of the operative fluid therein, said channel being thereafter opened at said third port to permit introduction of intake fluid therein when the expansion wave occasioned by the opening of the channel at the fourth port arrives at the first plate and reduces the static pressure in the channel to or below the pressure at the third port; the channel being closed by passing the fourth port at or later than the time when the interface between the intake fluid and the exhaust reaches the second plate and when the static pressure in the channel near said third port has dropped to or below the total pressure in said third port.

7. A wave engine comprising a rotor, a plurality of channels carried by said rotor, said channels extending from one side to the other of the rotor; means for rotating said rotor about its axis at high speed; said channels each being open at each end; a first stationary end plate on a first side of the rotor closing the channel ends on the first side; a second stationary end plate on the second side of the rotor closing the channel ends on the second side; a first port in the first end plate comprising an operative fluid inlet; a second port in the second end plate comprising a compressed fluid pick-up; a third port in one of the two end plates comprising an inlet for fluid to be compressed; a fourth port in the end plate opposite to that in which the third port is located comprising an exhaust; said channel ends registering with said ports during rotation of the rotor; said first, second, third and fourth ports being angularly positioned and proportioned with respect to each other to provide the following cycle of operation; each channel passing the fourth port and being closed at the end registering with the plate having the fourth port before it leaves the third port; each channel traversing the third port until the pressure wave generated by the impingement of intake fluid on the plate carrying the fourth port reaches the plate in which the third port is located; said channel passing the third port and being closed when said pressure wave reaches said plate; said channel thereafter passing said first port; the opening of said channel to said first port producing a compression wave in the gas to be compressed ahead of said operative fluid toward the second plate; said channel reaching said second port when the compression wave reaches said second plate; said channel being closed by passing said second port at a time interval after the opening of the channel at the first port which is a function of the length of the channel and of the flow velocity of the gases in the channel; said channel being closed by leaving said first port at a time interval preceding the closure of the channel when it leaves the second port; said time interval being equal to the time necessary for the expansion wave generated by the closing of the first port to overtake the interface at the closing edge of the second port; said time interval being a function of the length of the channel, the pressure, temperature and flow velocity of the operative fluid before it is affected by the expansion wave and of the clearance between the rotor and the first end plate; said channel being thereafter opened at said fourth port to permit exhaust of the operative fluid therein, said channel being thereafter opened at said third port to permit introduction of intake fluid therein at a time interval after the opening of the channel at the fourth port equal to the time necessary for the expansion wave generated by the opening of the channel at the fourth port to reach the first plate, said time interval being a function of the length of the channel, the pressure, temperature and flow velocity of the operative fluid after it has been affected by the expansion wave and of the clearance of the rotor and the plates, the channel being closed by passing the fourth port at a time interval after the opening of the channel at the third port which time interval has a value equal to or greater than a value which is a function of the length of the channel, the different temperatures of the gases, the equal pressures and flow velocities of the gases and of the clearances between the rotor and the plates.

8. A wave engine comprising a rotor, a plurality of channels carried by said rotor, said channels extending substantially parallel to the axis of the rotor; means for rotating said rotor about its axis at high speed; said channels each being open at each end; a first stationary end plate on a first side of the rotor closing the channel ends on the first side; a second stationary end plate on the second side of the rotor closing the channel ends on the second side; a first port in the first end plate comprising an operative fluid inlet; a second port in the second end plate comprising a compressed fluid pick-up; each channel passing said first port; said channel ends registering with said ports during rotation of the rotor; said first, second, third and fourth ports being angularly positioned and proportioned with respect to each other to provide the following cycle of operation; the opening of said channel to said first port producing a compression wave in the gas to be compressed ahead of said operative fluid toward the second plate; said channel reaching said second port when the compression wave reaches said second plate, said stationary end plates being spaced from said rotor by distance in which the leakage area around one channel amounts to 8% of the total channel cross-sectional area.

9. A wave machine comprising a rotor having a channel; said channel having a first end and a second end, a source of relatively hot gas; a first stator plate having a first port for providing a connection from said source of relatively hot gas to the first end for admitting hot gas from said source into said channel, said gas on impacting relatively cold and relatively stationary gas in said channel generating a compression wave which compresses the relatively low temperature gas in the channel, a second stator plate having a second port; said first and second stator plate being positioned adjacent said first and second end respectively of said channel; said channel having motion relative to said first and second stator plates; said second port being operatively positioned with respect to said first port to initiate the opening of said second end of said channel before the arrival of the compression wave thereat and at a time with relation to the then position and velocity of the compression wave so that the channel is from 50 to 75% open at the instant the compression wave arrives at the second end.

10. A wave machine comprising a rotor having a channel; said channel having a first end and a second end, a source of relatively hot gas; a first stator plate having a first port for providing a connection from said source of relatively hot gas to the first end for admitting hot gas from said source into said channel, said gas on impacting relatively cold and relatively stationary gas in said channel generating a compression wave which compresses the relatively low temperature gas in the channel, said compression wave traveling along said channel at a velocity which is a function of the temperature, pressure and clearance between said channel and said connection, a second stator plate having a second port; said first and second stator plate being positioned adjacent said first and second end respectively of said channel; said channel having motion relative to said first and second stator plates; said second port being operatively positioned with respect to said first port to initiate the opening of said second end of said channel before the arrival of the wave thereat and at a time with relation to the then position and velocity of the compression wave so that the channel is from 50 to 75% open at the instant the compression wave arrives at the second end.

11. A wave machine comprising a rotor having a channel; said channel having a first end and a second end, a source of relatively hot gas; a first stator plate having a first port for providing a connection from said source of relatively hot gas to the first end for admitting hot gas from said source into said channel, said gas on impacting relatively cold and relatively stationary gas in said channel generating a compression wave which compresses the relatively low temperature gas in the channel, a second stator plate having a second port; said first and second stator plate being positioned adjacent said first and second end respectively of said channel; said channel having motion relative to said first and second stator plates; said second port being operatively positioned with respect to said first port to initiate the opening of said second end of said channel before the arrival of the wave thereat and at a time with relation to the then position and velocity of the compression wave so that the channel is from 50 to 75% open at the instant the compression wave arrives at the second end, and for closing said channel at said second end when at least all of the compressed gas has passed therethrough.

12. A wave machine comprising a rotor having a channel; said channel having a first end and a second end, a source of relatively hot gas; a first stator plate having a first port for providing a connection from said source of relatively hot gas to the first end for admitting hot gas from said source into said channel, said gas on impacting relatively cold and relatively stationary gas in said channel generating a compression wave which compresses the relatively low temperature gas in the channel, a second stator plate having a second port; said first and second stator plate being positioned adjacent said first and second end respectively of said channel; said channel having motion relative to said first and second stator plates; said second port being operatively positioned with respect to said first port to initiate the opening of said second end of said channel before the arrival of the wave thereat and at a time with relation to the then position and velocity of the compression wave so that the channel is from 50 to 75% open at the instant the compression wave arrives at the second end, for closing said channel at said first end and for closing the channel at the second end when at least all of the compressed gas has passed therethrough and when an expansion wave resulting from the closing of the first end has reduced the velocity of the gas passing from said channel to said second end to 20% of its original velocity.

13. A wave machine comprising a rotor having a channel; said channel having a first end and a second end, a source of relatively hot gas; a first stator plate having a first port for providing a connection from said source of relatively hot gas to the first end for admitting hot gas from said source into said channel, said gas on impacting relatively cold and relatively stationary gas in said channel generating a compression wave which compresses the relatively low temperature gas in the channel, a second stator plate having a second port; said first and second stator plate being positioned adjacent said first and second end respectively of said channel; said channel having motion relative to said first and second stator plates; said second port being operatively positioned with respect to said first port to initiate the opening of said second end of said channel before the arrival of the wave thereat and at a time with relation to the then position and velocity of the compression wave so that the channel is from 50 to 75% open at the instant the compression wave arrives at the second end, for closing said channel at said first end and for closing the channel at said second end when at least all of the compressed gas has passed therethrough and when an expansion wave resulting from the closing of the first end has reduced the velocity of the gas passing from said channel to said second end to 20% of its original velocity; and means for driving out the hot gases in said channel and for introducing fresh cold gas into the channel for a repeat cycle of operation.

14. A wave machine comprising a rotor having a plurality of channels and a first and second stator plate; said channels having a first end and a second end; said first stator plate positioned at said first end of said channels; said second stator plate positioned at said second end of said channels; said channels having movement relative to said first and second stator plates; said first stator plate having a first port with a leading edge and a trailing edge; said second stator plate having a second port with a leading edge and a trailing edge; said leading edge of said second port being angularly positioned with respect to said leading edge of said first port to result in each channel being 50 to 75% open by said second port when a compression wave created at the leading edge of said first port arrives at said second end of said channel.

15. A wave machine comprising a rotor having a plurality of channels and a first and second stator plate; said channels having a first end and a second end; said first stator plate positioned at said first end of said channels; said second stator plate positioned at said second end of said channels; said channels having movement relative to said first and second stator plates; said first stator plate having a first port with a leading edge and a trailing edge; said second stator plate having a second port with a leading edge and a trailing edge; said leading edge of said second port being angularly positioned with respect to said leading edge of said first port to result in each channel being 50 to 75% open by said second port when a compression wave created at the leading edge of said first port arrives at said second end of said channel; said trailing edge of said second port angularly positioned with respect to said leading edge of said first port and said trailing edge of said first port angularly positioned with respect to the trailing edge of said second port to result in a channel being closed by said trailing edge of said second port when the velocity of an expansion wave is reduced by 20% and the expansion wave has overtaken the interface between fluid in the channel and fluid introduced into the channel through said first port.

16. A pressure exchanger comprising in combination a first and a second element mounted co-axially for relative rotation and means for effecting said relative rotation, said first element defining a ring of open-ended cells extending therethrough between two opposed faces thereof, said second element including low pressure inlet means to allow the introduction of low pressure fluid into said cells, high pressure outlet means to allow the extraction of high pressure fluid from said cells, said high pressure outlet means and said low pressure inlet means being circumferentially spaced from each other and both positioned adjacent one face of said first element, low pressure outlet means to allow the extraction of low pressure fluid from said cells and high pressure inlet means to allow the introduction of high pressure fluid into said cells, said low pressure outlet means and said high pressure inlet means being circumferentially spaced from each other and both positioned adjacent said other face of said first element, said low pressure inlet and outlet means together defining a low pressure scavenging zone and said high pressure inlet and outlet means together defining a high pressure scavenging zone, in which latter zone the scavenging of said cells is incomplete.

17. A pressure exchanger as claimed in claim 16 in which scavenging in said low pressure scavenging zone is substantially complete.

18. A wave engine comprising a rotor, a plurality of channels carried by said rotor; said rotor rotating about its axis at high speed; said channels each being open at each end; a first stationary end plate on a first side of said rotor closing the channel ends on the first side; a second stationary end plate on the second side of said rotor closing the channel ends on the second side; a first port in the first end plate comprising an operative fluid inlet; a second port in the second end plate comprising a compressed fluid pick-up; a third port in said second plate comprising an inlet for fluid to be compressed; a fourth port in said first end plate comprising a low pressure exhaust; said channel ends registering with said ports during rotation of the rotor; said first, second, third and fourth ports being angularly positioned and proportioned with respect to each other to provide the cycle of operation whereby said second port is a high pressure outlet and said fourth port is a low pressure outlet.

19. A wave engine comprising a rotor, a plurality of channels carried by said rotor; said channels each being open at each end; a first stationary end plate on a first side of said rotor closing the channel end on the first side; a second stationary end plate on the second side of said rotor closing the channel ends on the second side; a first port in said first end plate comprising an operative fluid inlet; a second port in said second end plate comprising a compressed fluid pick-up; a third port in said second end plate comprising an inlet for fluid to be compressed; a fourth port in said first end plate comprising a low exhaust; said channel ends registering with said ports during rotation of the rotor; said first, second, third and fourth ports being angularly positioned and proportioned with respect to each other to provide the following cycle of operation; each channel passing the fourth port and being closed at the end registering with first end plate before it passes the third port; each channel traversing the third port until the pressure wave generated by the intake fluid reaches the second end plate; said channel passing said third port and being closed when said pressure wave reaches said second end plate; said channel thereafter passing said first port; the opening of said channel to said first port producing a compression wave in said channel downstream of said operative fluid toward the second end plate; said channel reaching said second port when the compression wave reaches said second end plate; said channel passing said second port when the interface between the operative fluid and the fluid to be compressed in the channel reaches said second end plate; an expansion wave generated within said channel when said channel is closed by the lagging edge of said first port; said channel leaving said first port at an interval of time preceding the channel leaving said second port; said interval being equal to the time necessary for said expansion wave generated by the closing of the first port to overtake the interface at the closing edge of the second port.

20. A wave engine comprising a rotor, a plurality of channels carried by said rotor, said channels extending substantially parallel to the axis of the rotor; means for rotating said rotor about its axis at high speed; said channels each being open at each end; a first stationary end plate on a first end of said rotor closing the channel ends on the first end; a second stationary end plate on the second end of the rotor closing the channel ends on the second end; a pair of ports in each of said end plates; said channel ends registering with said ports during rotation of the rotor; a first port in the first end plate comprising an operative fluid inlet; a second port in the second end plate comprising a compressed fluid pick-up; a third port in said second plate comprising an intake for fluid to be compressed; a fourth port in said first end plate comprising an exhaust; each channel passing the fourth port and being closed at the end registering with said first end plate before it leaves the third port; each channel traversing the third port until the pressure wave generated by the impingement of intake fluid on said first end plate reaches said second end plate; said channel passing the third port and being closed when said pressure wave reaches said second end plate; said channel thereafter passing said first port; the opening of said channel to said first port producing a compression wave in the gas to be compressed ahead of said operative fluid toward said second end plate; said channel reaching said second port when the compression wave reaches said second end plate; said channel being closed by leaving said first port at a timed interval preceding the closure of the channel when it leaves the second port; said time interval being equal to the time necessary for the expansion wave generated by the closing of the first port to overtake the interface at the closing edge of the second port; said channels being thereafter opened at said fourth port to permit exhaust of the operative fluid therein; said channel being thereafter opened at said third port to permit introduction of intake fluid therein when the expansion wave occasioned by the opening of the channel at the fourth port arrives at the first plate and reduces the static pressure in the channel to or below the pressure at the third port.

21. A wave engine comprising a rotor, a plurality of channels carried by said rotor, said channels extending substantially parallel to the axis of the rotor; means for rotating said rotor about its axis at high speed; said channels each being open at each end; a first stationary end plate on a first end of the rotor closing the channel ends on the first end; a second stationary end plate on the second end of the rotor closing the channel ends; a first port in said first end plate comprising an operative fluid inlet; a second port in the second end plate comprising a compressed fluid pick-up; a third port in said second end plate comprising an inlet for fluid to be compressed; a fourth port in said first end plate comprising a low pressure exhaust; each channel passing the fourth port and being closed at the end registering with said first end plate before it passes the third port; each channel traversing the third port until the pressure wave generated by the introduction of intake fluid reaches said second end plate; said channel passing the third port and being closed when said pressure wave reaches said second end plate; said channel thereafter passing said first port; the opening of said channel to said first port producing a compression wave in said channel downstream of said operative fluid toward said second end plate; said channel reaching said second port when the compression wave reaches said second end plate; said channel leaving said first port at an interval of time preceding the channel leaving said second port.

22. A wave engine comprising a rotor, a plurality of channels carried by said rotor, said channels extending substantially parallel to the axis of the rotor; means for rotating said rotor about its axis at high speed; said channels each being open at each end; a first stationary end plate on a first end of the rotor closing the channel ends on the first end; a second stationary end plate on the second end of the rotor closing the channel ends on the second end; a pair of ports in each end plate; said channel ends registering with said ports during rotation of the rotor; a first port of said ports in said first end plate comprising an operative fluid inlet; a second port of said ports in said second end plate comprising a compressed fluid pick-up; a third port of said ports in said second end plate comprising an inlet for fluid to be compressed; a fourth port of said ports in said first end plate comprising a low pressure exhaust; each channel passing the fourth port and being closed at the end registering with said first end plate before it passes the third port; each channel traversing the third port until the pressure wave generated by the introduction of intake fluid reaches said second end plate; said channel passing the third port and being closed when said pressure wave reaches said second end plate; said channel thereafter passing said first port; the opening of said channel to said first port producing a compression wave in said channel downstream of said operative fluid toward the second plate; said channel reaching said second port when the compression wave reaches said second plate; said channel leaving said second port; said channel being closed by passing the second port when the velocity of the gas in that port has been reduced to one-fifth of the initial undisturbed velocity.

References Cited in the file of this patent

UNITED STATES PATENTS

| | | |
|---|---|---|
| 2,045,152 | Lebre | June 23, 1936 |
| 2,399,394 | Seippel | Apr. 30, 1946 |

OTHER REFERENCES

Power Plant Engineering (Sidler), Chicago, Ill., July 1947 (pages 128 and 130).